United States Patent [19]

Haraguchi et al.

[11] Patent Number: 4,694,189

[45] Date of Patent: Sep. 15, 1987

[54] CONTROL SYSTEM FOR VARIABLE SPEED HYDRAULIC TURBINE GENERATOR APPARATUS

[75] Inventors: Eiji Haraguchi, Ibaraki; Hiroto Nakagawa, Osaka; Akira Bando, Hitachi; Takao Kuwahara, Hitachi; Haruo Nohara, Hitachi; Kenichi Ono, Hitachi, all of Japan

[73] Assignees: Hitachi, Ltd., Tokyo; The Kansai Electric Power Co., Inc., Osaka, both of Japan

[21] Appl. No.: 911,131

[22] Filed: Sep. 24, 1986

[30] Foreign Application Priority Data

Sep. 25, 1985 [JP] Japan .............................. 60-210004
Sep. 25, 1985 [JP] Japan .............................. 60-210005

[51] Int. Cl.$^4$ .............................................. F01D 15/10
[52] U.S. Cl. .................................. 290/40 C; 290/43; 290/52
[58] Field of Search ............... 290/40 A, 40 C, 40 R, 290/43, 52, 54; 60/361, 445, 448, 459, 911

[56] References Cited

U.S. PATENT DOCUMENTS

| | | | |
|---|---|---|---|
| 2,548,462 | 4/1951 | Baker | 290/40 A |
| 3,848,171 | 11/1974 | Speth et al. | 290/52 X |
| 4,287,429 | 9/1981 | Bashnin et al. | 290/40 C |
| 4,297,589 | 10/1981 | Bashnin et al. | 290/40 R |
| 4,367,890 | 1/1983 | Spirk | 290/54 X |
| 4,394,098 | 7/1983 | Wirschal et al. | 290/52 X |
| 4,625,125 | 11/1986 | Kuwabara | 290/52 |

Primary Examiner—William M. Shoop, Jr.
Assistant Examiner—W. E. Duncanson, Jr.
Attorney, Agent, or Firm—Fay, Sharpe, Beall, Fagan, Minnich & McKee

[57] ABSTRACT

A control system for variable speed hydraulic turbine generator apparatus comprises an induction generator connected at its primary side to an AC power line system, a secondary excitation controller connected to the secondary side of the induction generator and being responsive to a generator output command signal supplied externally to supply to the induction generator an excitation current which causes the induction generator to generate AC power at the same frequency as that on the AC power line system, a hydraulic turbine for rotating the induction generator, a guide valve for regulating the amount of water supplied to the hydraulic turbine, a rotation speed detector for detecting a rotation speed of the induction generator, a rotation speed command calculator for receiving a hydraulic turbine running condition signal inclusive of the external generator output command signal and calculating an optimum rotation speed command, a rotation speed controller for comparing the optimum rotation speed command with a rotation speed signal from the rotation speed detector and producing a guide valve opening control signal in accordance with a difference between the optimum rotation speed command and the rotation speed signal, and a guide valve driver responsive to the guide valve opening control signal to deliver to the guide valve a signal which controls the opening of the guide valve in accordance with the guide valve opening control signal.

10 Claims, 25 Drawing Figures

F I G. 18
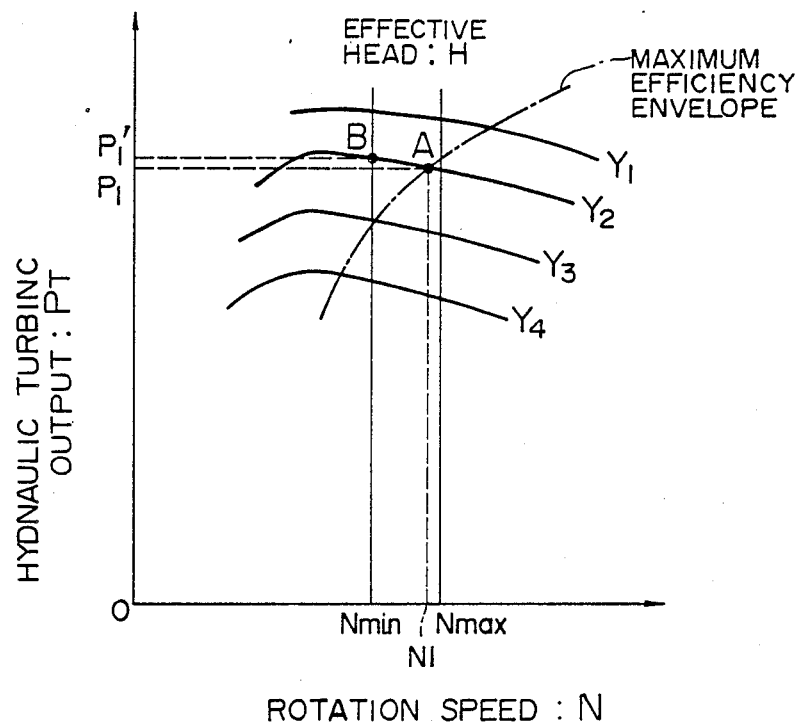
F I G. 19
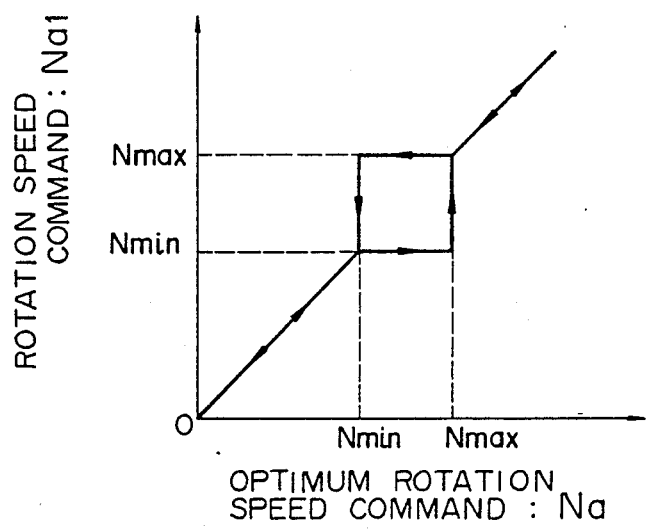

CONTROL SYSTEM FOR VARIABLE SPEED HYDRAULIC TURBINE GENERATOR APPARATUS

BACKGROUND OF THE INVENTION

This invention relates to a variable speed hydraulic turbine generator apparatus utilizing an induction generator and a secondary excitation controller connected to the secondary side of the induction generator and more particularly to a control system for variable speed hydraulic turbine generator apparatus which is suitable for realizing running and frequency control at a maximum efficiency point.

One of major objectives of performing speed control for a rotary electric machine is to realize a running of the rotary electric machine at a maximum efficiency point of a turbo-machine by controlling the rotation speed of the rotary electric machine in accordance with a load, such as a pump hydraulic turbine, on the turbo-machine. There are available two major methods for variable speed operation of a hydraulic turbine of a hydraulic turbine generator apparatus.

The first one is the provision of a frequency converter between an AC power line system and a generator. JP-A-48-21045 proposes a method wherein supply of power to the AC power line system can be ensured even when the generator is operated at any desired speeds and the rotation speed is adjusted by regulating a guide value of the hydraulic turbine to realize a running at a maximum efficiency point of the hydraulic turbine.

The second method is to connect the primary side of a wound-rotor type induction machine to the AC power line system and to provide a frequency converter between the secondary side and the AC power line system. This method has hitherto been known as a typical way of controlling the rotation speed in accordance with the output of the generator and is described in, for example, the Electrical Engineering Handbook published by the Institute of Electrical Engineers of Japan in 1967. Control systems for this type of variable speed hydraulic turbine generator apparatus have been proposed as disclosed in, for example, JP-A-52-46428, specification and drawings of Japanese patent application No. 57-182920, and JP-A-55-56499.

A common task shared by the above two types of variable speed hydraulic turbine generator apparatus resides in how the hydraulic turbine output and the generator output are controlled to control the rotation speed. More specifically, the task is directed to how to use, for controlling the outputs of the hydraulic turbine and the generator, a speed different signal (Na−N) resulting from a comparison between an optimum rotation speed command Na calculated from a signal containing an external generator output command signal Po supplied externally to indicate a hydraulic turbine running condition and a rotation speed detection value N. This is because, in an arrangement comprises of a hydraulic turbine and a generator mechanically coupled thereto, it is general that kinetic energy of a fluid flow in the water channel is on the one hand less than kinetic energy of rotation of the mechanical system, i.e., the hydraulic turbine and that loss of the generator is, on the other hand, almost negligible in regulation of the rotation speed, with the result that the difference between the outputs of the hydraulic turbine and generator almost corresponds to an increase or decrease in the kinetic energy of rotation and hence may be used for regulation of the rotation speed of the generator. The external generator output command Po herein referred to means a generator output command other than an internal output command which may be calculated from measured signals representative of voltage, current, frequency, phase and rotation speed of components such as the hydraulic turbine, generator and frequency converter which constitute the variable speed generator apparatus. Specifically, the external generator output command is externally supplied from a central power feed commanding station.

In the aforementioned JP-A-55-56499 proposing a control system for variable speed hydraulic turbine generator apparatus wherein the wound-rotor type induction machine is connected at its secondary side to the AC power line system and the frequency converter is provided between the secondary side and the AC power line system, three kinds of measured signals representative of the speed of drive medium (water flow rate in the case of hydraulic turbine), rotation speed and output of generator stator are employed for controlling the outputs of the generator and hydraulic turbine. This publication however fails to suggest a specified manner of controlling the outputs of the generator and hydraulic turbine. It also fails to suggest how the generator output should respond to the external generator output command Po.

The aforementioned JP-A-52-46428 and specification and drawings of Japanese patent application No. 57-182920 proposing another control system for variable speed hydraulic turbine generator apparatus suggest a control method wherein a rotation speed difference signal is used for controlling the generator output.

BRIEF DESCRIPTION THE DRAWINGS

FIG. 18 is a graph useful to explain the operation of the ninth embodiment and showing the relation of the hydraulic turbine output to the rotation speed and guide valve opening.

FIG. 19 is a graph showing the relation between the input and output signals of a hysteresis function generator used in the ninth embodiment.

Figure 23:
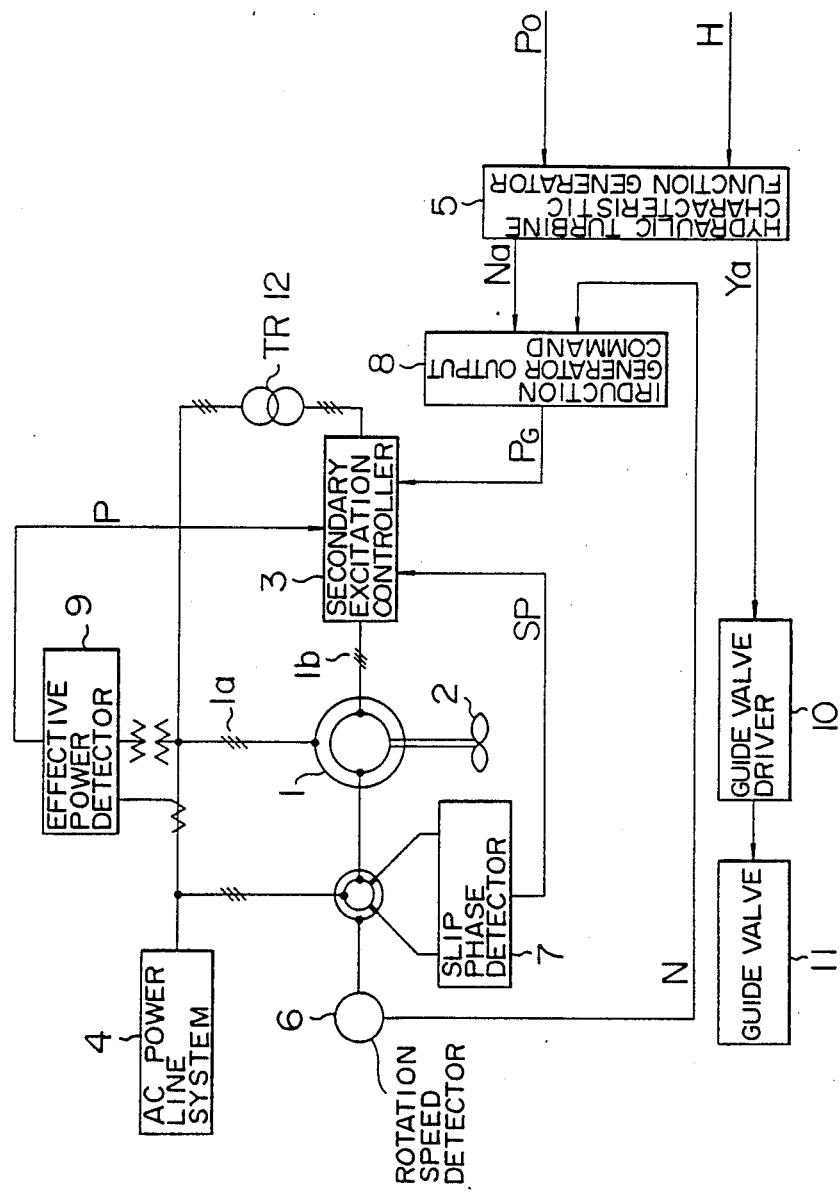
FIG. 23 is a block diagram showing a prior art control system for variable speed hydraulic turbine generator.

Referring to FIG. 23, an example of the construction of a prior art control system for variable speed hydraulic turbine generator apparatus will first be described. An induction generator 1 is rotated by a hydraulic turbine 2 directly coupled to its rotor, and its secondary winding 1b is supplied with an Ac excitation current whose phase is regulated by a secondary excitation controller 3 comprised of a frequency converter (cycloconverter) to a predetermined value in accordance with a rotation speed of the induction generator 1, so that the induction generator 1 is operated at variable speeds to produce from its primary winding 1a AC power at the same frequency as that of voltage on an AC power line system 4. A hydraulic turbine characteristic function generator 5 receives an external generator output command Po and a water head detection signal H which are supplied externally and generates an optimum rotation speed command Na and an optimum guide valve opening command Ya which are required for an operation with maximum efficiency. A slip phase detector 7 detects a slip phase Sp equal to a difference between a phase of voltage on the AC power line system 4 and a rotation phase of the secondary side of induction generator 1 in terms of electrical angle. A rotor of the slip phase detector 7 is wound with a three-phase winding connected in parallel with the primary winding 1a of the induction generator 1 and a stator of the slip phase detector 7 is mounted with Hall converters respectively located at circumferentially different positions spaced by an electrical angle of $\pi/2$, so that a signal in phase, as viewed from the secondary side of induction generator 1, with the voltage on the AC power line system 4 is detected by the Hall converters and converted into the slip phase Sp. An induction generator output commander 8 compares an optimum rotation speed command Na delivered out of the hydraulic turbine characteristic function generator 5 with a rotation speed detection signal N from a rotation speed detector 6 to produce an induction generator output command $P_G$. The induction generator output command $P_G$ and the slip phase signal Sp from slip phase detector 7 are supplied to the secondary excitation controller 3 which in turn controls the AC excitation current supplied to the secondary winding 1b of induction generator 1 such that an output detection signal P of induction generator 1 detected by an effective power detector 9 equals the induction generator output command $P_G$. As an example, an excitation current controlling method proposed in Japanese Patent Publication No. 57-60645 may specifically be applied. A guide valve driver 10 is responsive to an optimum guide valve opening command Ya from the hydraulic turbine characteristic function generator 5 to regulate the opening of a guide valve 11 so that a hydraulic turbine output PT may be controlled. The secondary excitation controller 3 connects to the AC power line system 4 through a transformer TR 12.

Figure 24:
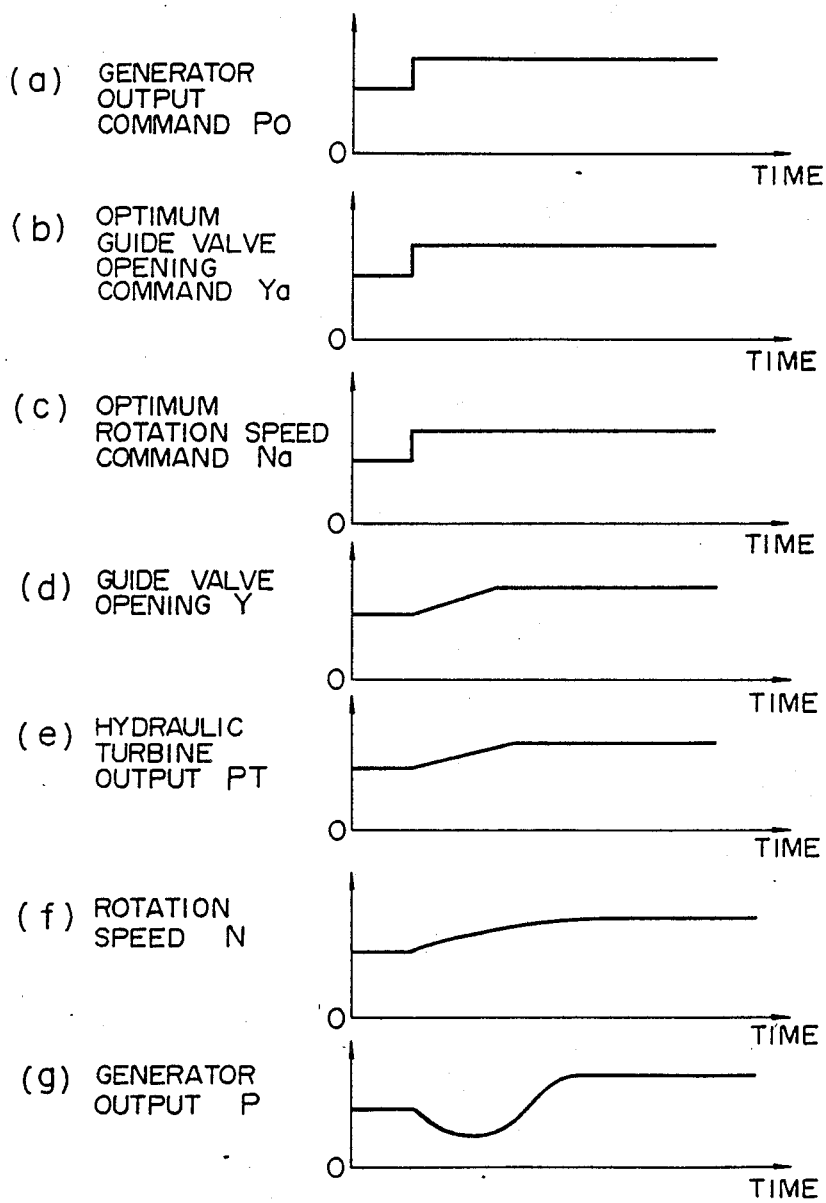
FIG. 24 illustrates at sections (a) through (g) signal waveforms develoing in the prior art control system shown in FIG. 23.

With the control system of FIG. 23, when the external generator output command Po is changed as indicated at section (a) in FIG. 24 with a view of increasing the generator output P stepwise, the optimum rotation speed command Na and the optimum guide valve opening command Ya respond to a stepped increase in the generator output command Po to rise stepwise as indicated at sections (c) and (b) in FIG. 24. Consequently, opening Y of the guide valve 11 is controlled by the guide valve driver 10 so as to gradually proceed to coincidence with the guide valve opening command Ya as indicated at section (d) in FIG. 24, and this change in opening Y of the guide valve 11 causes the hydraulic turbine output PT to change to a value corresponding to the external generator output command Po as indicated at (e) in FIG. 24. On the other hand, in order to increase the rotation speed N of the induction generator 1 as indicated at (f) in FIG. 24 until coincidence with the optimum rotation speed command Na, kinetic energy of the rotary system of the generator apparatus is required to be increased by an amount commensurate with an increase in the rotation speed N. Only way to this end involves either increasing the hydraulic turbine output PT or decreasing the generator output P. However, the hydraulic turbine output PT is determined, as described previously, by the opening Y of guide valve 11 which changes with the optimum guide valve opening command Ya and therefore will not be increased rapidly. Consequently, an increased amount of the kinetic energy is supplied to the rotary system by decreasing the generator output P, with the result that the generator output P desired to be increased is unintentionally decreased transiently as indicated at (g) in FIG. 24, thus adversely affecting the working of the power line system. For prevention of the transient decrease in the generator output P, it is conceivable that within the induction generator output commander 8, the optimum rotation speed command Na from the hydraulic turbine characteristic function generator 5 is initially sent to a component such as a linear delay element capable of suppressing a rapid signal change and an output of the component is then compared with the rotation speed detection signal N from the rotation speed detector 6 to produce the induction generator output command $P_G$. This method advantageously permits part of an increased amount of the turbine output PT to be supplied for increasing the rotation kinetic energy and also permits the remainder to be distributed for increasing the output P of the induction generator 1. But, even with this method, the output P of the induction generator 1 can not be increased before the increase of the hydraulic turbine output PT and disadvantageously, the response speed of the generator apparatus itself is eventually suppressed by the response of the guide valve driver 10. This problem is also encountered when the external generator output command Po is decreased stepwise. Essentially, these problems stem from the fact that only the output of the induction generator 1 is regulated to control the rotation speed N.

The prior art control system has difficulties with the output controlling and rotation speed controlling in the variable speed hydraulic turbine generator apparatus, as has been described so far. Another problem is encountered in controlling the frequency of the AC power line system with the variable speed hydraulic turbine generator apparatus, as will be described below.

Figure 25:
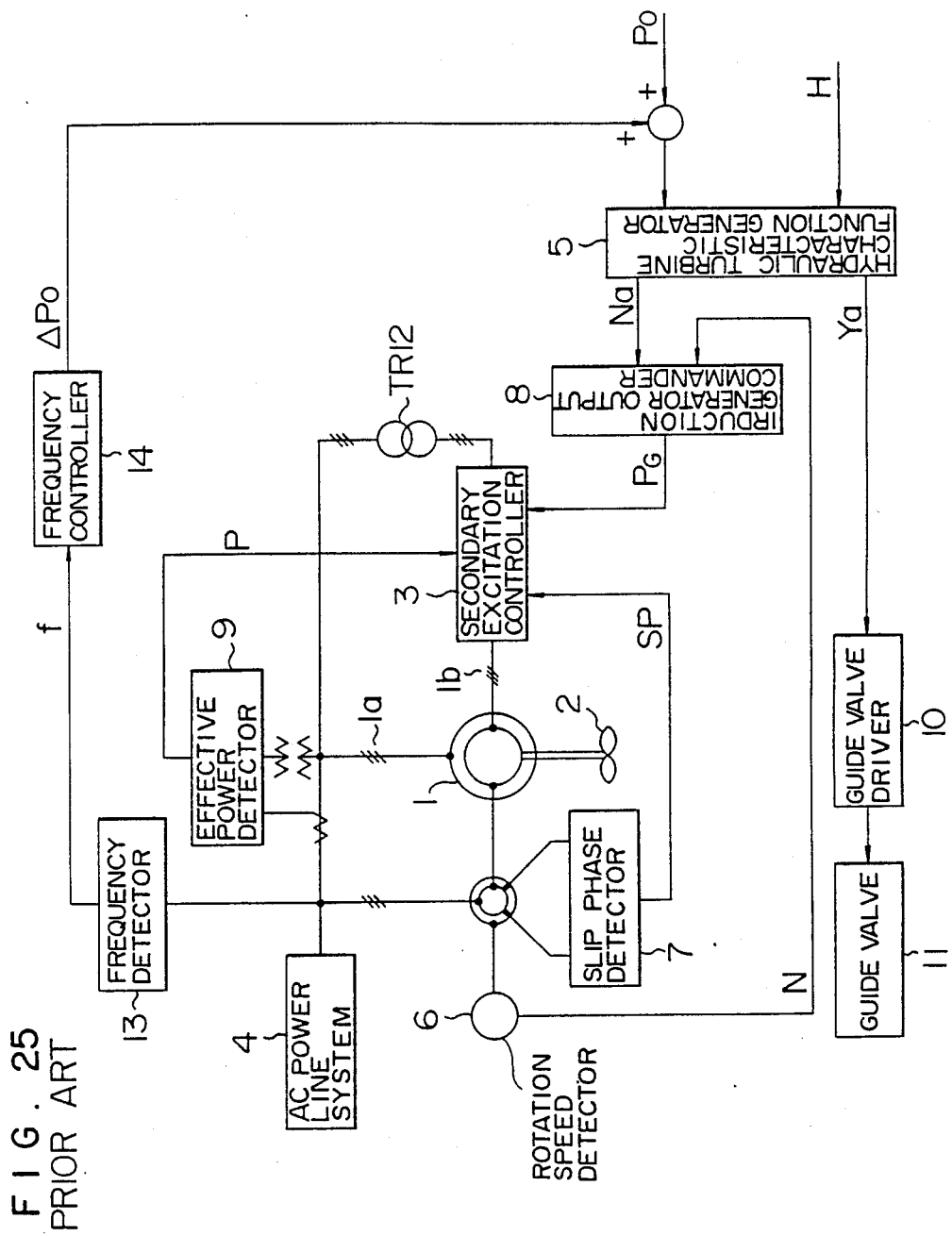
FIG. 25 is a block diagram showing another prior art control system.

The generator apparatus, which employs for variable operation the secondary excitation controller with a frequency converter interconnected between the secondary side of the induction generator and the AC power line system, is characteristic of the fact that the rotation speed does not coincide with the frequency on the AC power line system. From this point of view, Japanese patent application No. 58-199041 proposes a method of controlling the frequency of the AC power line system to a predetermined value. This proposal takes advantage of the fact that while the generator output delivered to the AC power line system must be controlled for controlling the frequency, an output commensurate with a change in the generator output must be supplied from the hydraulic turbine to the generator for the sake of maintaining the rotation speed at an optimum value. An example of the construction in accordance with this proposal is illustrated in FIG. 25 where the same components as those of FIG. 23 are designated by the same reference numerals. Only different components will be described with reference to FIG. 25. A frequency detector 13 detects the frequency of the AC power line system 4, and a frequency controller 14 compares a frequency detection signal f with a frequency set value fo to calculate a generator output command modifying signal ΔPo. Assume now that the generator output command modifying signal ΔPo rises stepwise and the input to the hydraulic turbine characteristic function generator 5 increases stepwise. Under this situation, the output P of the induction generator 1 responds so as to change in quite the same manner as the output P shown at section (g) in FIG. 24. In other words, the output P of the induction generator 1 will not respond to reflect the change of the generator output command modifying signal ΔPo and the intentional frequency controlling disadvantageously leads to a large transient frequency difference.

Returning to FIG. 23, an instance will be considered wherein the induction generator 1 is operated approximately at the synchronous speed. Under this condition, in a cyclo-converter included in the excitation controller 3, the interval for current polarity change is long and during the long interval, current is permitted to conduct through one of anti-parallel connected converter elements of the cyclo-converter, resulting in a significant reduction in output current capacity of the cyclo-converter. The rotation speed range as above is responsible for reduction of the output current capacity of the cyclo-converter and is called a cyclo-converter output forbidden zone. Of course, the capacity of a cyclo-converter designed not to have the output forbidden zone becomes far larger than that of a cyclo-converter designed to have the output forbidden zone.

Accordingly, it has been practice either to sacrifice a generator output range overlapping the cyclo-converter output forbidden zone by using a cyclo-converter of a small capacity which is designed to have the output forbidden zone or to sustain the operation over the entire generator output range by using a cyclo-converter of a large capacity which is designed not to have the output forbidden zone.

SUMMARY OF THE INVENTION

Therefore, a generator apparatus of the type discussed so far which can employ a cyclo-converter of a small capacity but without the output forbidden zone has long been desired.

An object of this invention is to eliminate the prior art drawbacks and to improve stability of the AC power line system by making the generator output smoothly follow the generator output command without decreasing efficiency of power generation.

Another object of this invention is to provide a variable speed hydraulic turbine generator apparatus which can employ a cyclo-converter of a minimal capacity but without the output forbidden zone.

According to this invention, a control system for variable speed hydraulic turbine generator apparatus comprises an induction generator connected at its primary side to an AC power line system; a secondary excitation controller connected to the secondary side of the induction generator and being responsive to a generator output command signal supplied externally to supply to the induction generator an excitation current which causes the induction generator to generate AC power at the same frequency as that on the AC power line system; a hydraulic turbine for rotating the induction generator; a guide valve for regulating the amount of water supplied to the hydraulic turbine; a rotation speed detector for detecting a rotation speed of the induction generator; a rotation speed command calculator for receiving a hydraulic turbine running condition signal inclusive of the external generator output command signal and calculating an optimum rotation speed command; a rotation speed controller for comparing the optimum rotation speed command with a rotation speed signal from the rotation speed detector and producing a guide valve opening control signal in accordance with a difference between the optimum rotation speed command and the rotation speed signal; and a guide valve driver responsive to the guide valve opening control signal to deliver to the guide valve a signal which controls the opening of the guide valve in accordance with the guide valve opening control signal.

The invention will now be described by way of example with reference to the accompanying drawings.

DETAILED DESCRIPTION OF THE PREFERRED EMBODIMENTS

Figure 1:
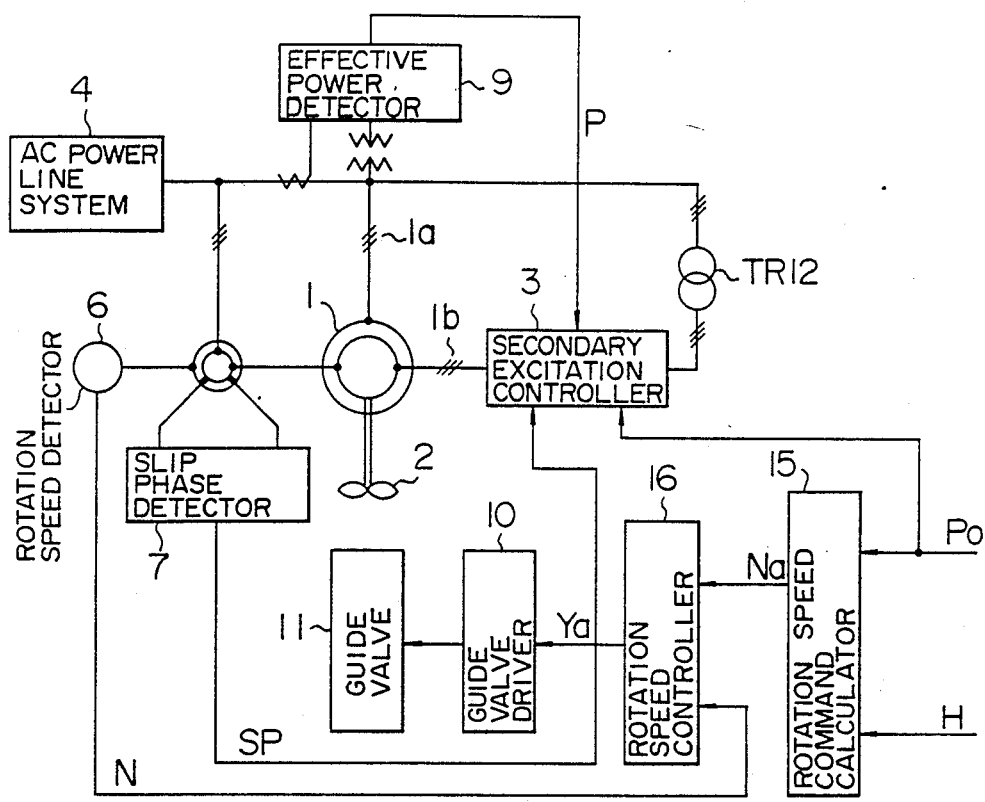
FIG. 1 is a block diagram of a control system according to a first embodiment of the invention.

Referring to FIG. 1, there is illustrated a control system according to a first embodiment of the invention. In FIG. 1, the same components as those of FIG. 23 illustrative of the prior art are designated by the same reference numerals, and only different components, will be described with reference to FIG. 1. A rotation speed command calculator 15 is responsive to a generator output command Po and a water head signal H, both supplied externally, to generate an optimum rotation speed command Na. In a generator apparatus subject to less variations in head, the optimum rotation speed command Na may be produced from only the external generator output command Po without using the water head signal H as input signal. A rotation speed controller 16 compares the optimum rotation speed command Na with a rotation speed signal N detected by a rotation speed detector 6 and produces a guide valve opening command Ya.

Figure 2:
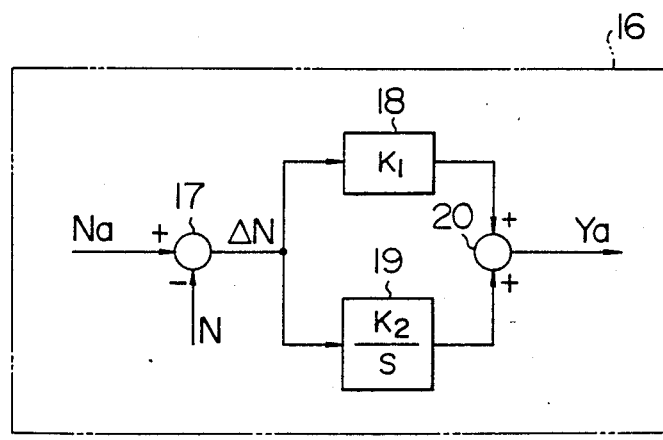
FIG. 2 is a block diagram of a rotation speed controller used in the first embodiment.

FIG. 2 shows an example of the rotation speed controller 16. A comparator 17 produces a rotation speed difference ΔN. The rotation speed difference ΔN is supplied to a proportional element 18 defining K1, where K1 is a gain and an integration element 19 defining K2/S, where K2 is a gain and S is the Laplace operator, and output signals from these elements are added together by an adder 20 to produce the guide valve opening command Ya which is fed to a guide valve driver 10.

The external generator output command Po is also supplied to a secondary excitation controller 3.

Figure 3:
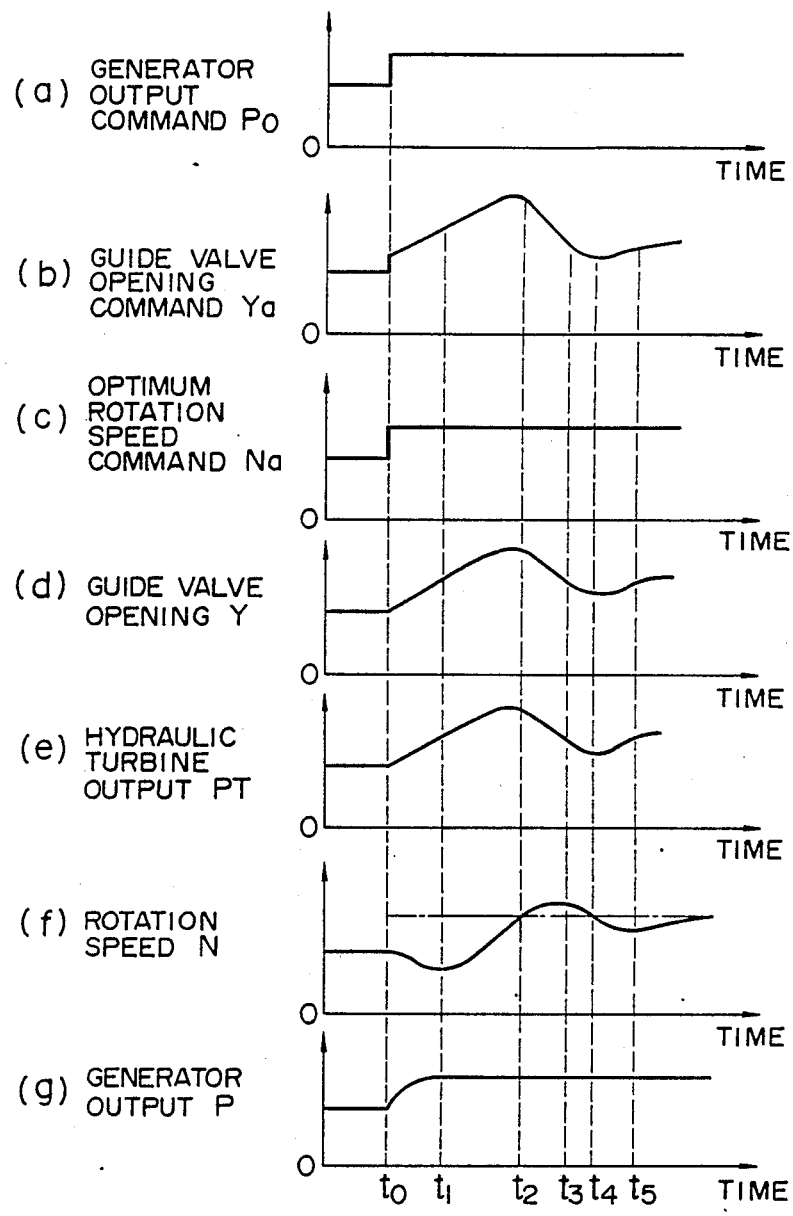
FIG. 3 illustrates at sections (a) through (g) signal waveforms developing in the first embodiment.

With the control system constructed as above, where the generator output command Po is raised stepwise at time $t_o$ as indicated at section (a) in FIG. 3 with a view of raising generator output P, for example, stepwise, the generator output P of an induction generator 1 follows a change in the generator output command Po and rises as indicated at (g) in FIG. 3. On the other hand, the optimum rotation speed command Na also increases stepwise as indicated at (c) in FIG. 3 to change the output of the proportional element 18, followed by a stepped change of the guide valve opening command Ya as indicated at (b) in FIG. 3. However, the response speed of opening Y of the guide valve 11 is slower than the speed of response of the generator output P to the generator output command Po. As a result, the hydraulic turbine output PT becomes smaller than the generator output P and the rotation speed N is temporarily decelerated after the rapid change of the generator output command Po. Thereafter, at time $t_1$ that the generator output P equals the hydraulic turbine output PT, the rotation speed N becomes minimum. Since the speed difference ΔN is positive at time $t_1$, the integration element 19 causes the guide valve opening command Ya to continue to increase. Consequently, the guide valve opening Y continues increasing. When the rotation speed N becomes equal to the optimum rotation speed command Na at time $t_2$, the guide valve opening Y becomes maximum. Subsequently, the guide valve opening Y and rotation speed N undergo damped oscillation, with the rotation speed N converging to the optimum rotation speed command Na. Referring to FIG. 3, the hydraulic turbine output PT equals the generator output P at times $t_3$ and $t_5$, and the rotation speed N equals the optimum rotation speed command Na at time $t_4$.

As will be seen from the above, the rotation speed N can converge to the optimum rotation speed Na by making the generator output P follow the change in the external generator output command Po at a speed faster than the response of the guide valve 11. This is accomplished by initially using up rotation kinetic energy to make the generator output P follow the change in the external generator output command Po to thereby maintain the output P of induction generator 1 at the external generator output command Po while controlling the guide valve 11 such that rotation kinetic energy necessary for regulating the rotation speed N toward the optimum rotation speed command is supplied.

Figure 4:
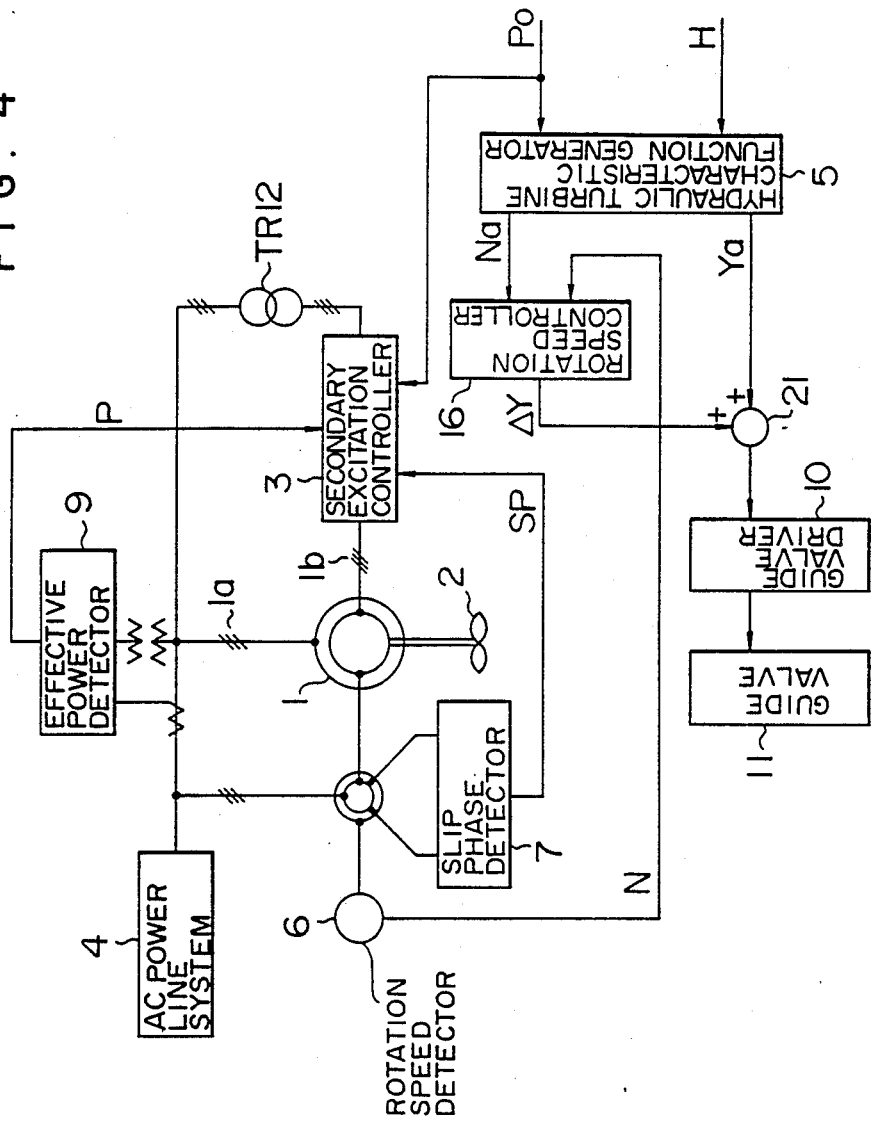
FIG. 4 is a block diagram of a control system according to a second embodiment of the invention.

FIG. 4 illustrates a second embodiment of the invention. Only components different from those of FIG. 1 will be described with reference to FIG. 4. A hydraulic turbine characteristic function generator 5 is responsive to the external generator output command Po and water head signal H to generate the optimum guide valve opening command Ya and optimum rotation speed command Na. If variations in head are small, the water head signal H may be omitted. A rotation speed controller 16 having the same construction as that illustrated in FIG. 2 produces a guide valve opening correction signal ΔY which is added at an adder 21 with the optimum guide valve opening command Ya from the hydraulic turbine characteristic function generator 5. A resultant signal is fed to the guide valve driver 10.

Figure 5:
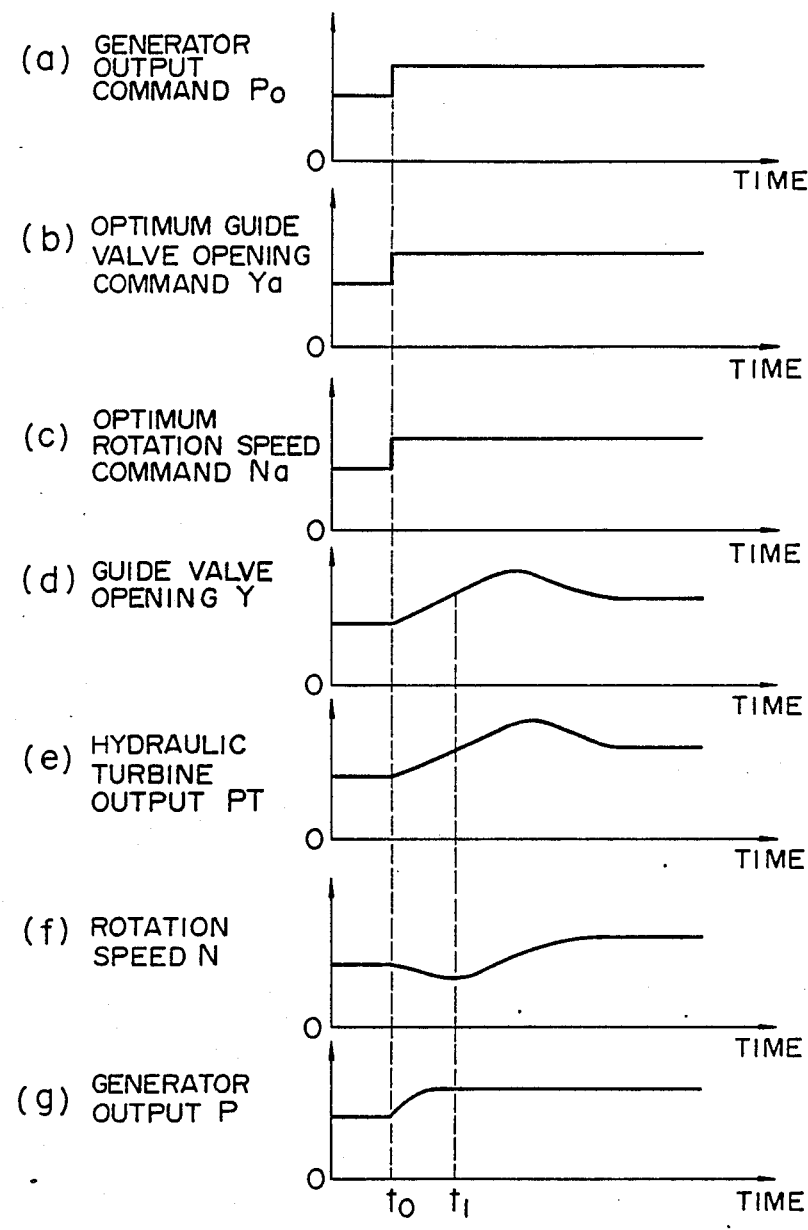
FIG. 5 illustrates at sections (a) through (g) signal waveforms developing in the second embodiment.

With the control system of this embodiment constructed as above, when the generator output command Po is raised stepwise at time $t_0$ as indicated at (a) in FIG. 5 in order to raise the generator output P, for example, stepwise, the generator output P of the induction generator 1 follows a change in the generator output command Po and rises as indicated at (g) in FIG. 5. On the other hand, the response of opening Y of the guide valve 11 to the optimum guide valve opening command Ya is slower than the response of the generator output P to the generator output command Po. As a result, the hydraulic turbine output PT becomes smaller than the generator output P and the rotation speed N is temporarily decelerated after the rapid change of the generator output command Po. Thereafter, at time $t_1$ the generator output p equals the hydraulic turbine output PT, the rotation speed N becomes minimum. Since the speed difference ΔN is positive at time $t_1$, the guide valve opening correction signal ΔY is also positive and the guide valve opening Y is further increased beyond the optimum guide valve opening command Ya. Consequently, the hydraulic turbine output PT exceeds the generator output P and the rotation speed N begins to increase as indicated at (f) in FIG. 5. The increasing rotation speed N gradually cancels out the difference from the optimum rotation speed command Na and the decreasing guide valve opening correction signal ΔY decreases the hydraulic turbine output pt, thereby suppressing acceleration of the rotation speed N.

In the FIG. 4 embodiment, the speed difference ΔN under the stationary condition is made zero by means of the integration element 19. On the other hand, the difference between the optimum guide valve opening command Ya from the hydraulic turbine characteristic function generator 5 and the guide valve opening Y corresponds to the difference between a hydraulic turbine characteristic stored in the hydraulic turbine characteristic generator 5 and an actual characteristic of the hydraulic turbine 2 and it can be made almost zero by improving the accuracy of a hydraulic turbine characteristic function. Accordingly, it is sufficient that the integration element 19 should generate only the guide valve opening difference (Ya−Y) under the stationary condition. This contrasts the FIG. 4 embodiment with the FIG. 1 embodiment wherein the integration element 19 has to generate the entire guide valve opening command Ya under the stationary condition. In the FIG. 1 embodiment, with the aim of accelerating the response of the guide valve 11, the gain K2 of the integration element 19 is necessarily made larger than a certain value at the cost of appreciably oscillatory responses of the hydraulic turbine output PT as indicated at (e) in FIG. 3 and of the rotation speed N as indicated at (f) in FIG. 3. Contrary to this, in the FIG. 4 embodiment, the response speed can be accelerated even by increasing the gain K1 of the proportional element 18 having damping effect and decreasing the gain K2 of the integration element 19 relatively or correspondingly. Further, as indicated at (e) and (f) in FIG. 5, the hydraulic turbine output PT and the rotation speed N can converge to command values without attended by damping.

Figure 6:
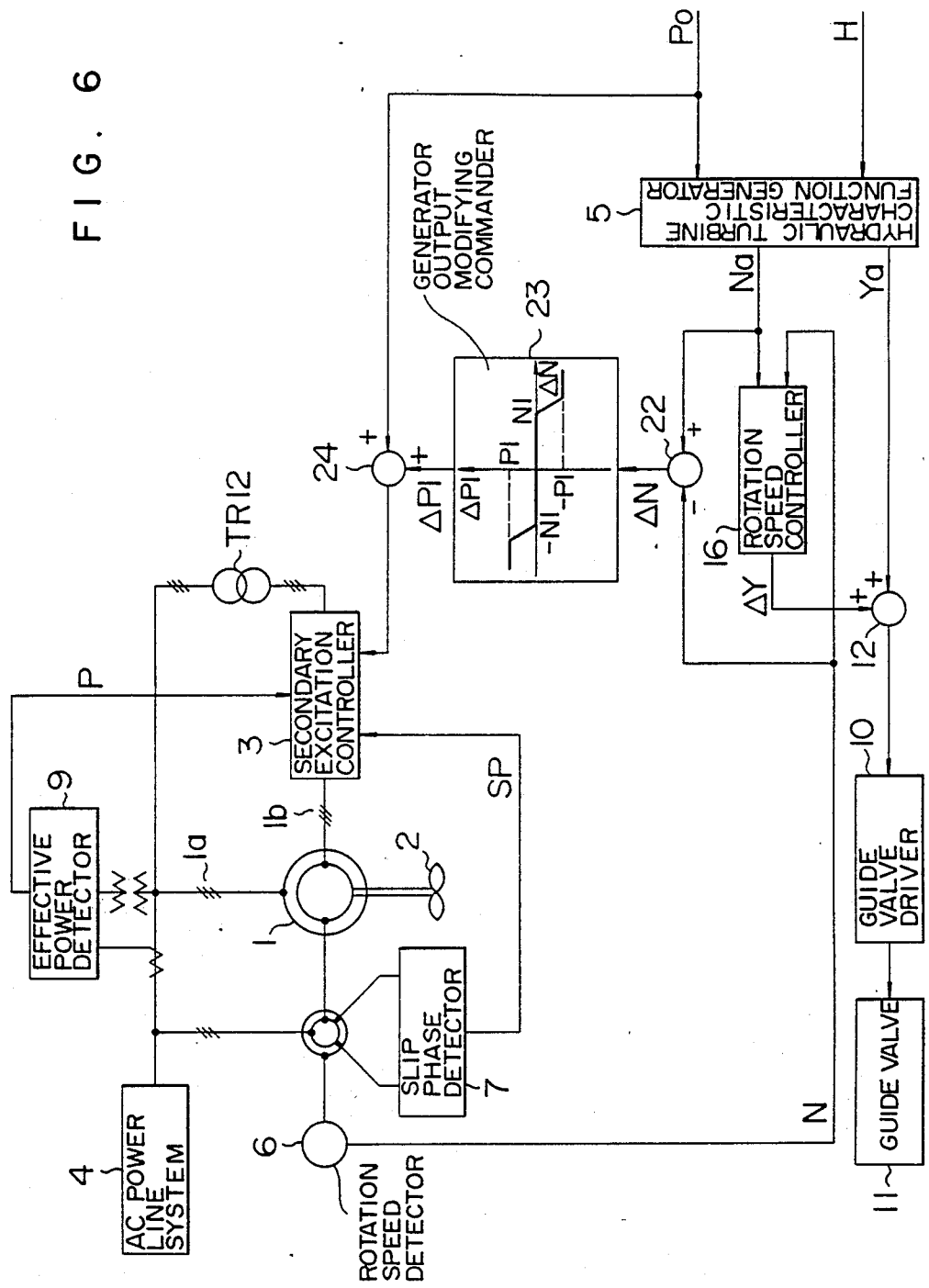
FIG. 6 is a block diagram of a control system according to a third embodiment of the invention.

FIG. 6 shows a third embodiment of the invention which is a modification of the FIG. 4 embodiment. Only different components will be described with reference to FIG. 6. A comparator 22 produces a difference $\Delta N$ between the optimum rotation speed command Na and the rotation speed detection value N. The rotation speed difference $\Delta N$ is applied to a generator output modifying commander 23, and an output signal $\Delta P1$ from the commander 23 is added with the external generator output command signal Po at an adder 24, a resultant signal being supplied, as a generator output command signal, to the second excitation controller 3.

The generator output modifying commander 23 has a function as below. Within a range where the absolute value of rotation speed difference $\Delta N$ is less than N1, the generator output modifying command signal $\Delta P1$ is kept zero, and when the absolute value of rotation speed difference $\Delta N$ exceeds N1, the absolute value of generator output modifying command signal $\Delta P1$ proportional increases as the absolute value of rotation speed difference $\Delta N$ increases but can not exceed P1.

In the control system constructed as above, when the generator output command Po is started at time $t_0$ to increase along a ramp as indicated at (a) in FIG. 7 with a view of increasing the generator output P, for example, along a ramp until it approximates a maximum output of the hydraulic turbine, the response is obtained as will be described below. For the sake of comparison, the response obtained with the FIG. 4 embodiment when the generator output command is increased along a ramp under the same condition will first be explained with reference to FIG. 8. As the generator output command Po increases along a ramp throughout times $t_0$ to $t_3$ as indicated at (a) in FIG. 8, the optimum rotation speed command Na remains at a minimum rotation speed determined by a rated voltage of the secondary excitation controller and the like factors until time $t_1$ as indicated at (c) in FIG. 8. Till then, the optimum guide valve opening command Ya nearly equals the guide valve opening Y as indicated at (b) in FIG. 8. After time $t_1$, the optimum rotation speed command Na increases as the generator output command Po increases, to provide the difference $\Delta N$ from the rotation speed N by which the guide valve opening Y is rendered to exceed the optimum guide valve opening command Ya fed from the hydraulic turbine characteristic function generator 5, thereby starting supplying part of the hydraulic turbine output as an increment of rotation kinetic energy. At time $t_2$, the guide valve opening Y reaches a maximum value and the hydraulic turbine output PT becomes substantially constant as indicated at (d) in FIG. 8. In order to approximate the rotation speed N to the optimum rotation speed command Na the rotation kinetic energy must be increased by increasing the hydraulic turbine output PT beyond the generator output P. However, after time $t_3$, the increment of the rotation kinetic energy becomes small in inverse proportion to an increase in ultimate value of the generator output command Po, as indicated at (d) and (e) in FIG. 8, and the rotation speed N becomes less accelerated. As a result, the rotation speed difference $\Delta N$ becomes small, thereby prolonging an interval of time terminating in time $t_4$ that the guide valve opening Y begins to converger to the optimum guide valve opening command Ya, and attainment of a running of the hydraulic turbine with maximum efficiency is prolonged before the rotation speed N converges to the optimum rotation speed command Na. Therefore, in some applications, efficiency degradation is so imminent that it can not be neglected.

Figure 7:
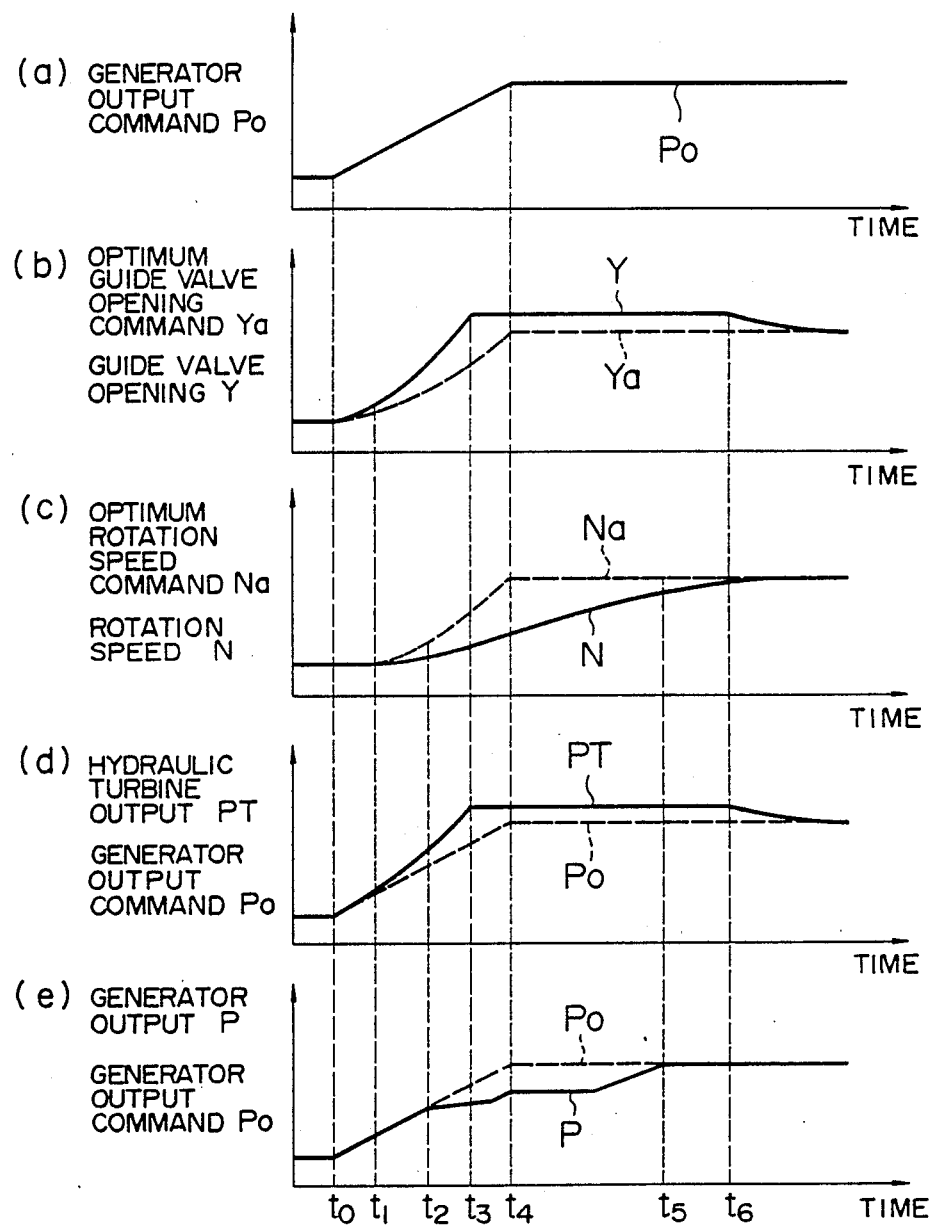
FIG. 7 illustrates at sections (a) through (e) signal waveforms developing in the third embodiment.
Figure 8:
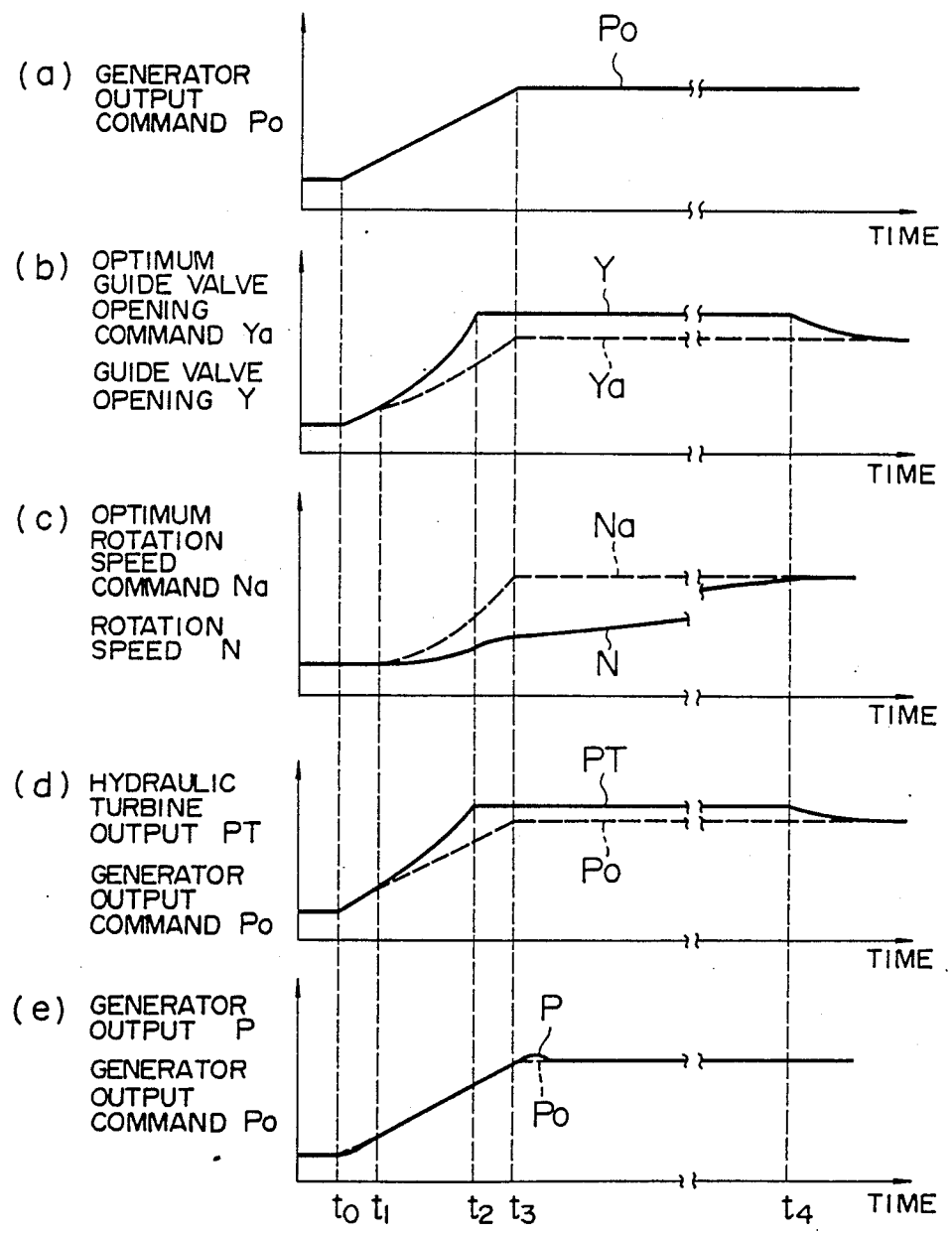
FIG. 8 is a similar waveform diagram but showing signal waveform appearing in the second embodiment.

Turning to FIG. 7, the rotation speed N and other parameters in the FIG. 6 embodiment respond in guide the same manner as those explained in connection with FIG. 8 until time $t_1$. From time $t_1$ that the optimum rotation speed command begins to increase as indicated at (c) in FIG. 7, the rotation speed difference $\Delta N$ starts increasing and at time $t_2$, it reaches N1 preset by the generator output modifying commander 23. After time $t_2$, the generator output modifying commander 23 generates the generator output modifying command $\Delta P1$ in a direction in which the generator output command Po supplied externally to the secondary excitation controller 3 is cancelled out. Consequently, the generator output P falls below the generator output command Po as indicated at (e) in FIG. 7 and the acceleration of the rotation speed N is increased by an amount corresponding to an increment of the difference between the hydraulic turbine output PT and the generator output P. The guide valve opening Y becomes maximum at time $t_3$ and the generator output command Po reaches a maximum value at time $t_4$. When the rotation speed difference $\Delta N$ again decreases to N1 at time $t_5$, the generator output modifying command signal $\Delta P1$ becomes zero. At time $t_6$, the rotation speed N approximates to the optimum rotation speed command Na, and the guide valve opening Y begins to decrease for converging to the optimum guide valve opening Ya. Therefore, it follows that the generator output P is suppressed throughout times $t_2$ to $t_5$ to promote acceleration of the rotation speed N toward the optimum rotation speed command Na. This embodiment is effective for changing the generator output command Po to a great extent and particularly, suited for use as a control system for variable speed hydraulic turbine generator apparatus wherein moment of inertia of the rotary part is large relative to the rated generator output.

Figure 9:
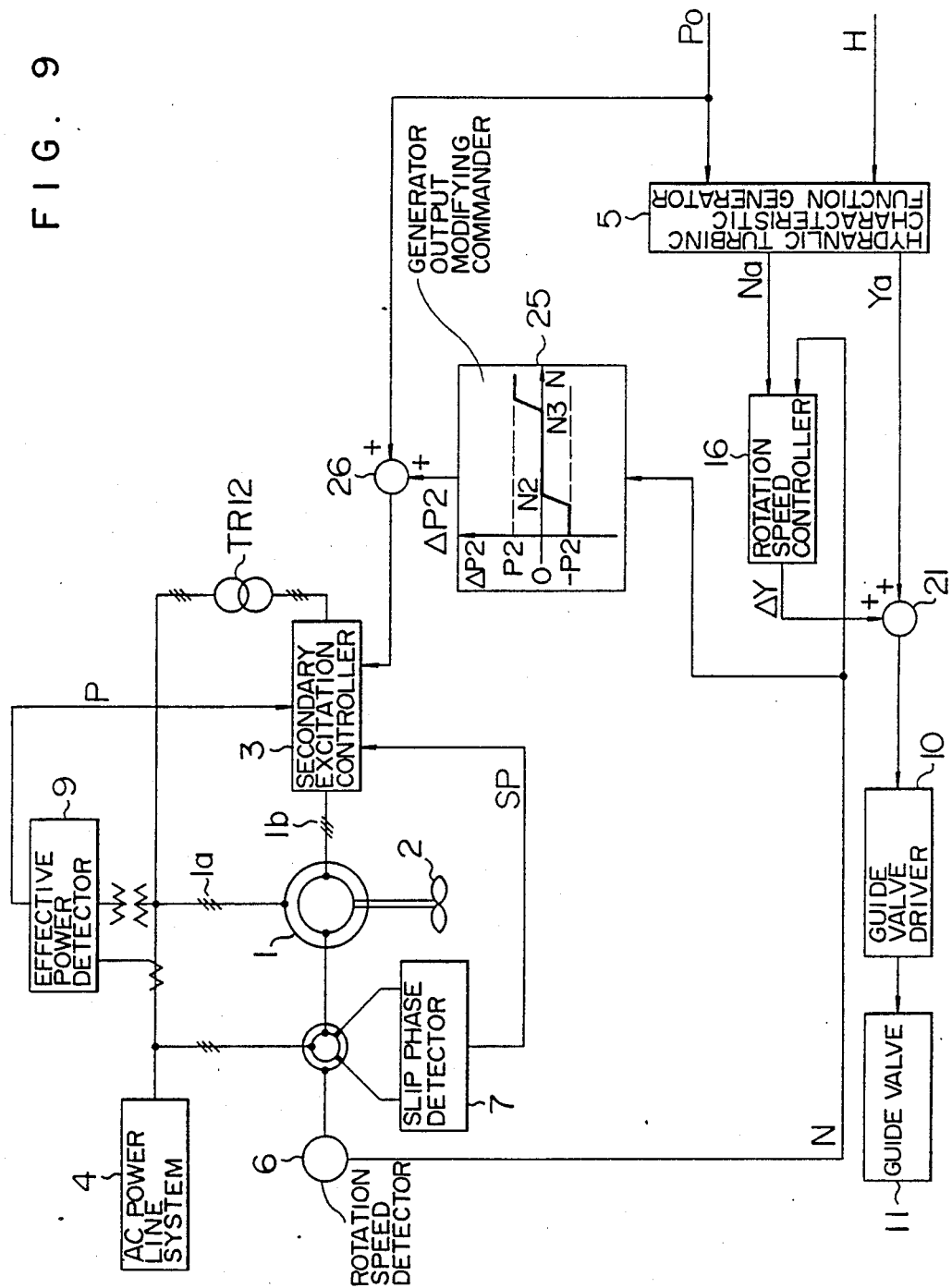
FIG. 9 is a block diagram of a control system according to a fourth embodiment of the invention.

FIG. 9 shows a fourth embodiment of the invention which is another modification of the FIG. 4 embodiment. Only different components will be described with reference to FIG. 9. The rotation speed N detected by the rotation speed detector 6 is supplied to a generator output modifying commander 25, an output signal $\Delta P2$ from the generator output modifying commander 25 is added with the external generator output command signal Po at an adder 26, and a resultant signal is supplied as a generator output command signal to the secondary excitation controller 3. The function of the generator output modifying commander 25 shown in FIG. 9 will be explained. When the rotation speed N lies between preset values N2 and N3, the generator output modifying command signal $\Delta P2$ is kept zero and then the rotation speed N falls below the preset value N2, the generator output modifying command signal $\Delta P2$ decreases in proportion to a decrease in the rotation speed N. Conversely, when the rotation speed N goes beyond the preset value N3, the generator output modifying command signal $\Delta P2$ increases in proportion to an increase in the rotation speed N. The absolute value of the generator output modifying command signal $\Delta P2$, however, can not exceed P2. The preset values N2 and N3 define a rotation speed range determined by a rated voltage and a frequency output range of the frequency converter constituting the secondary excitation controller 3 and strength of mechanical parts of the induction generator 1 and hydraulic turbine 2.

Figure 10:
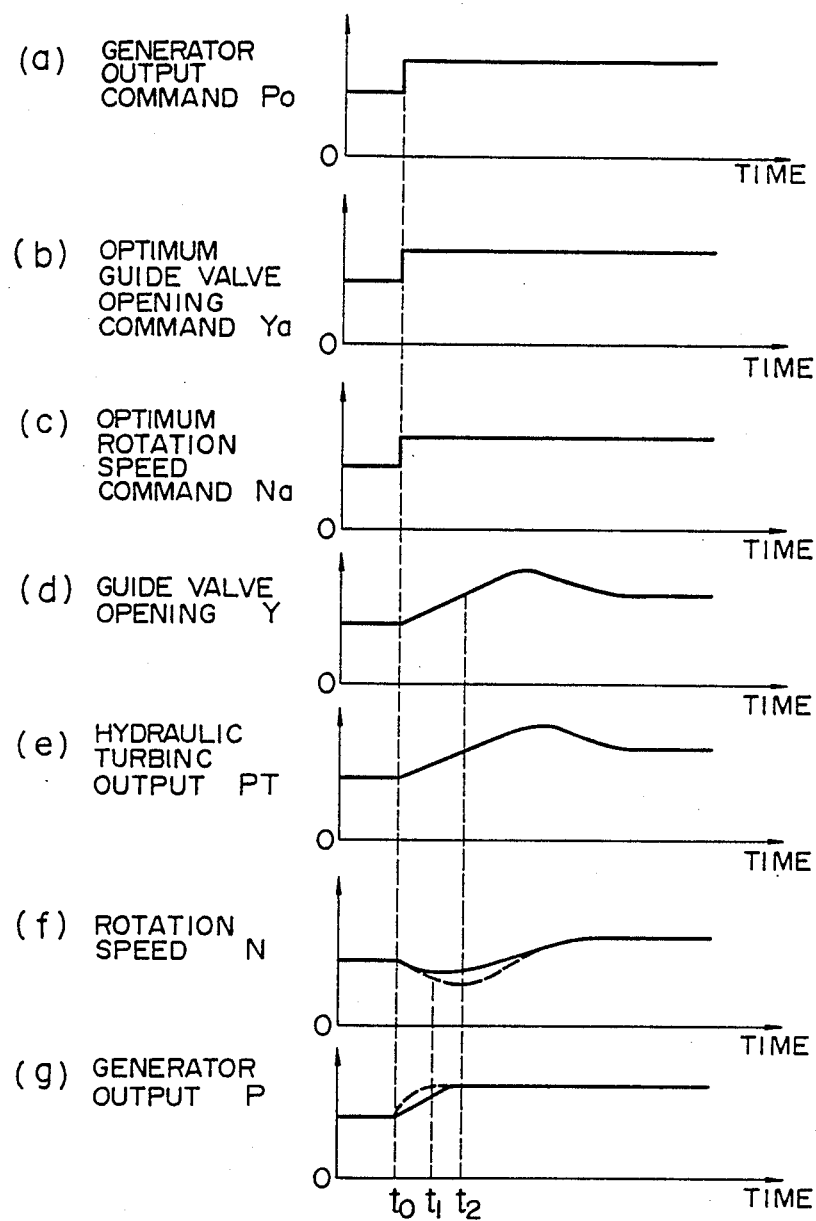
FIG. 10 illustrates at sections (a) through (g) signal waveforms appearing in the fourth embodiment.

With the control system constructed as above, when the generator output command Po is raised stepwise at time $t_0$ as indicated at (a) in FIG. 10 with a view of increasing the generator output P stepwise under the condition that the rotation speed N approximates the preset value N2, the response is obtained as will be described below. At time $t_0$ that the generator output command Po rises, the rotation speed N, like the waveform shown in FIG. 5, temporarily decreases as indicated at (f) in FIG. 10 in opposition to a change in the optimum rotation speed command Na. As the rotation speed N falls below the preset value N2, a generator output command originating from the generator output modifying command $\Delta P2$ and supplied to the secondary excitation controller 3 becomes less than the externally supplied generator output command Po. Consequently, the hydraulic turbine output PT coincides with the generator output P at time $t_1$ which is earlier than time $t_2$ the hydraulic turbine output PT coincides with the generator output command Po. By adopting this embodiment, the time the rotation speed N becomes minimum shifts from time $t_2$ for a dashed curve to time $t_1$ for a solid curve as indicated at (f) in FIG. 10. At the same time, transient overshooting of the rotation speed in the reverse direction can be suppressed considerably. This embodiment is efficient for controlling the rotation speed such that it falls within the preset rotation speed range of the variable speed hydraulic turbine generator apparatus. Obviously, this embodiment may be implemented in combination with the FIG. 6 embodiment.

Figure 11:
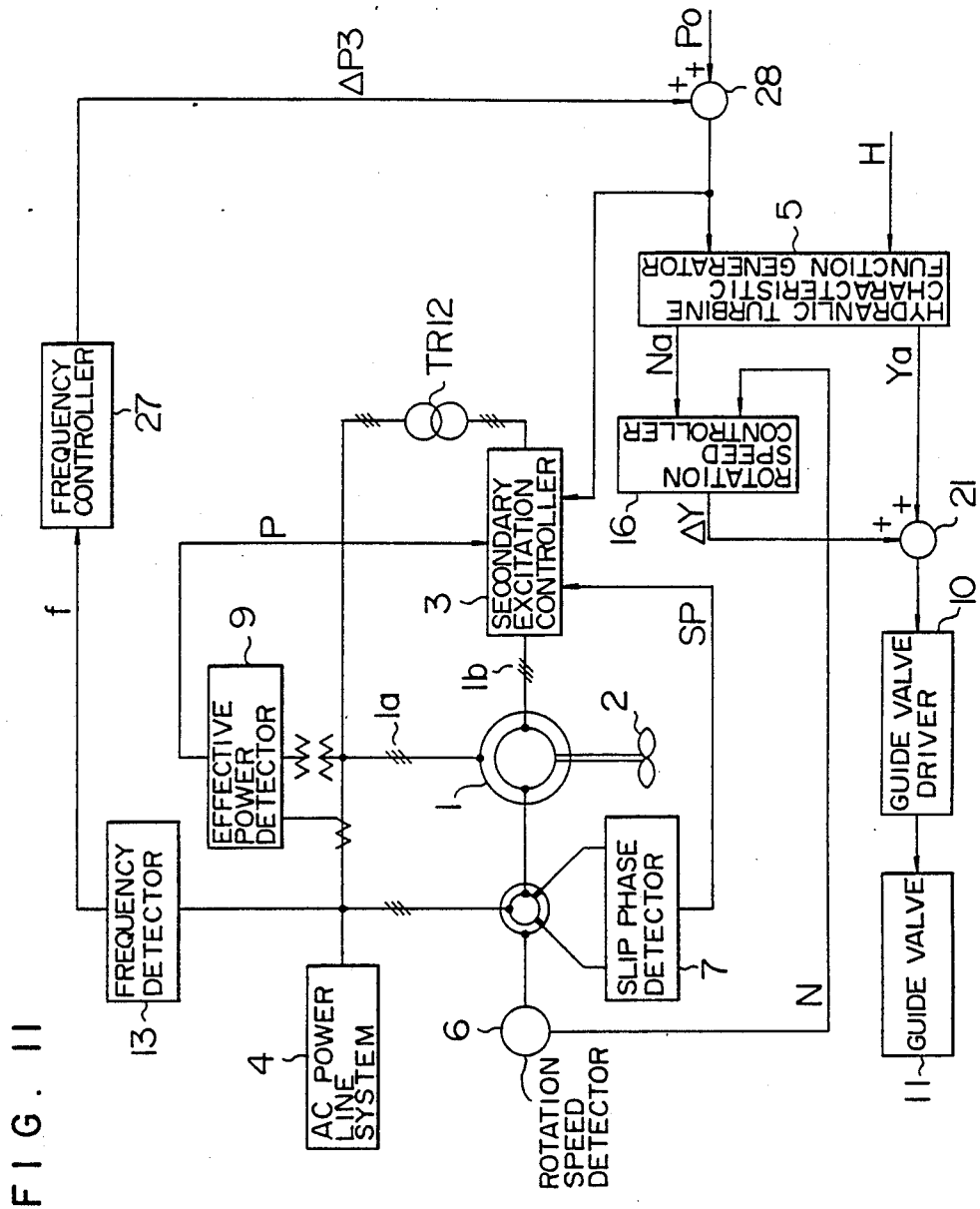
FIG. 11 is a block diagram showing a control system according to a fifth embodiment of the invention.
Figure 12:
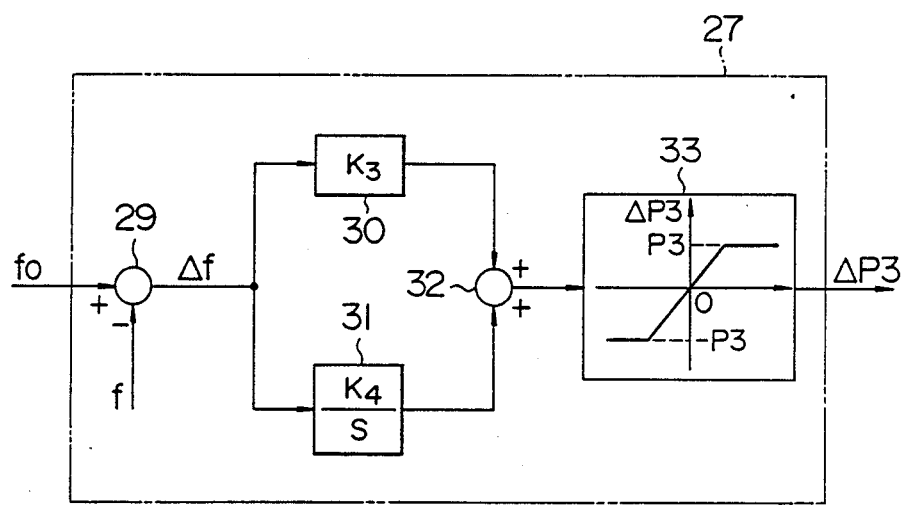
FIG. 12 is a block diagram of a frequency controller used in the fifth embodiment.

FIG. 11 illustrate a fifth embodiment of the invention which is still another modification of the FIG. 4 embodiment. Only different components will be described with reference to FIG. 11. A frequency detector 13 detects the frequency on the AC power line system 4, and a frequency controller 27 compares a frequency detection signal f delivered out of the frequency detector 13 with a frequency set value fo to produce a generator output modifying command signal $\Delta P3$. The command signal P3 is added to the external generator output command Po by means of an adder 28, and a resultant signal is supplied to the hydraulic turbine characteristic function generator 5 and the secondary excitation controller 3. FIG. 12 shows an example of the frequency controller 27. A comparator 29 produces a difference $\Delta f$ between the frequency set value fo and frequency detection signal f. The frequency difference $\Delta f$ is applied to a proportional element 30 of a gain $K_3$ and an integration element 31 defining $K_4/S$, where $K_4$ is a gain, and output signals of these elements are added together at an adder 32 and then fed to an limiter 33. The limiter 33 is configured to suppress the absolute value of the generator output modifying command signal $\Delta P3$ to P3 or less.

With this construction, the generator output modifying command signal $\Delta P3$ calculated from the frequency difference $\Delta f$ can be used for regulating both the hydraulic turbine guide valve driver 10 and secondary excitation controller 3, thus attaining frequency controlling along with stable rotation speed controlling.

Figure 13:
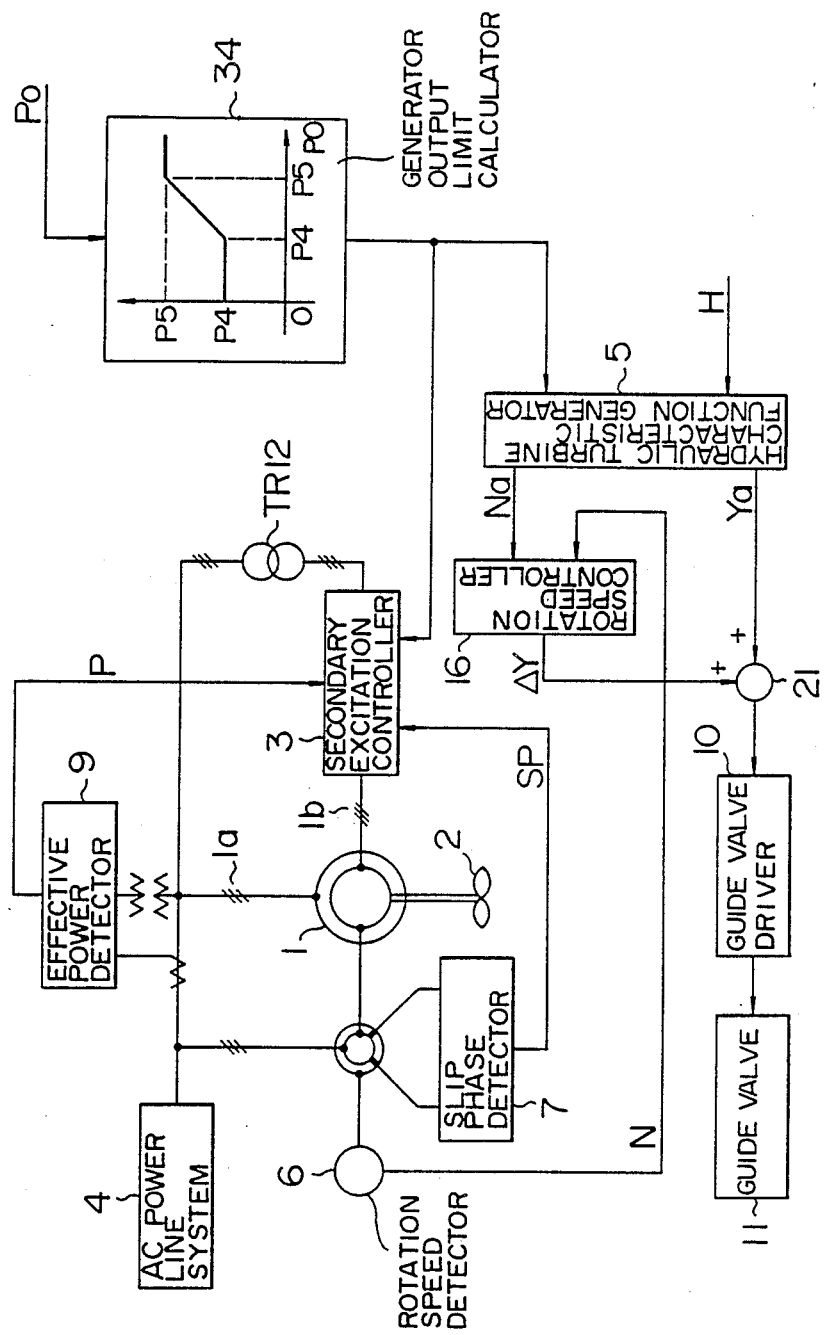
FIGS. 13, 14, 15 and 16 are block diagrams showing control systems according to sixth, seventh, eighth and ninth embodiments of the invention, respectively.

FIG. 13 illustrates a sixth embodiment of the invention which is a further modification of the FIG. 4 embodiment. Only different components will be described with reference to FIG. 13. In the field of the variable speed hydraulic turbine generator apparatus, there has not yet been available any specified proposal directed to handling an extremely supplied generator output command which is not confined within a power generation permissible range of the generator apparatus. The embodiment of FIG. 13 makes an approach to this problem. A generator output limit calculator 34 suppresses its output to a preset value P5 when the external generator output command signal Po exceeds the preset value P5 and to a preset value P4 when the command signal Po is below the preset value P4, and a resulting output from the generator output limit calculator 34 is supplied to the secondary excitation controller 3 and the hydraulic turbine characteristic function generator 5.

Figure 14:
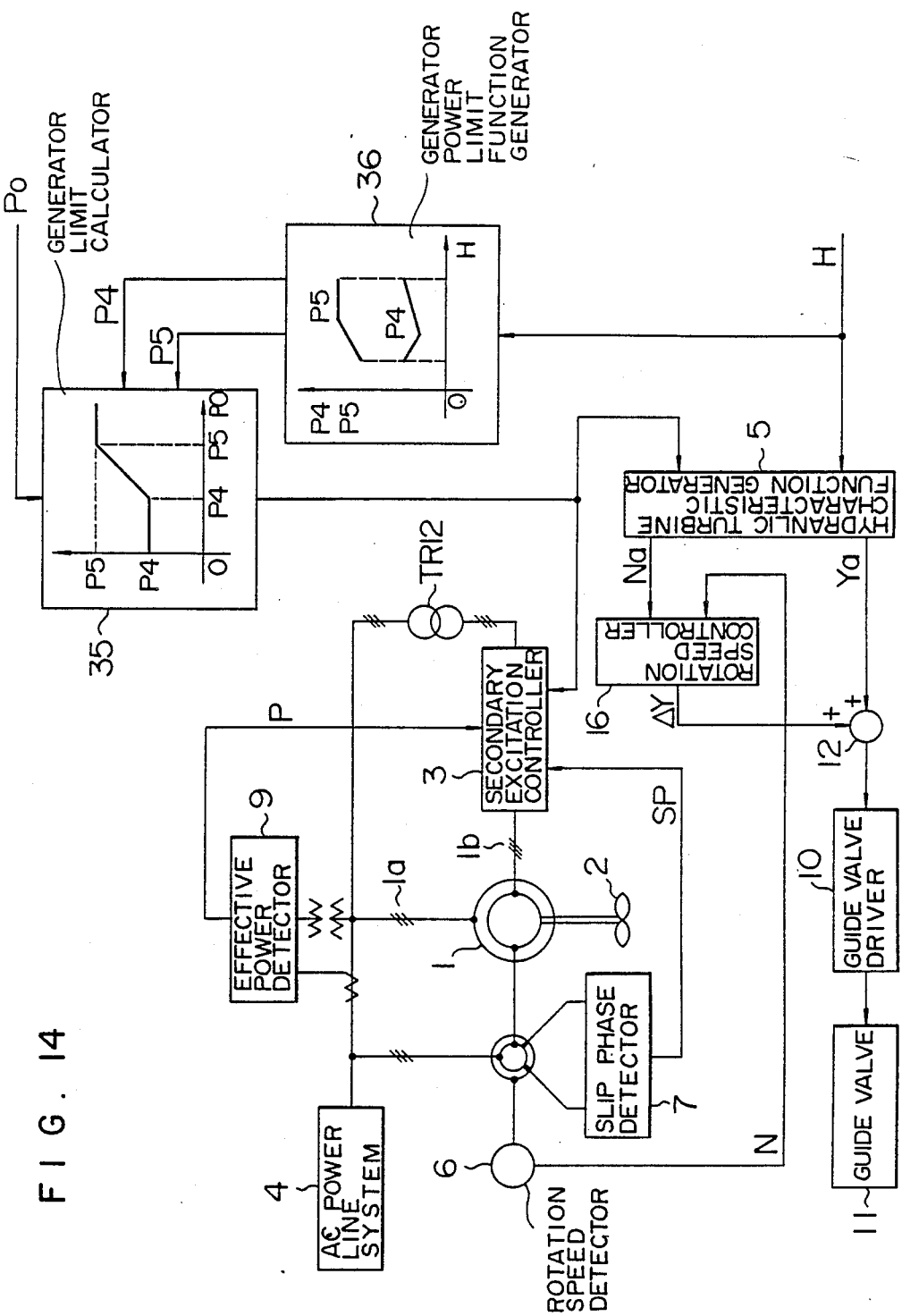

FIG. 14 illustrates a seventh embodiment of the invention which is a modification of the FIG. 13 embodiment A generator output limit calculator 35, like the aforementioned calculator 34, confines the generator output command Po within a range determined by the preset values P4 and P5. Specifically, in this embodiment, the generator output limit calculator 35 receives the preset values P4 and P5 from a generation power limit function generator 36. The generation power limit function generator 36 receives the water head H to produce an upper limit P5 and a lower limit P4 of generation power output. The upper and lower limits P4 and P5 are determined by a hydraulics characteristic of the hydraulic turbine 2, an output limit of the induction generator 1, and a voltage output limit and an output frequency range of the secondary excitation controller 3. This embodiment permits a variable speed hydraulic turbine generator apparatus subject to large variations in water head to be prevented from being loaded with an overload.

Figure 15:
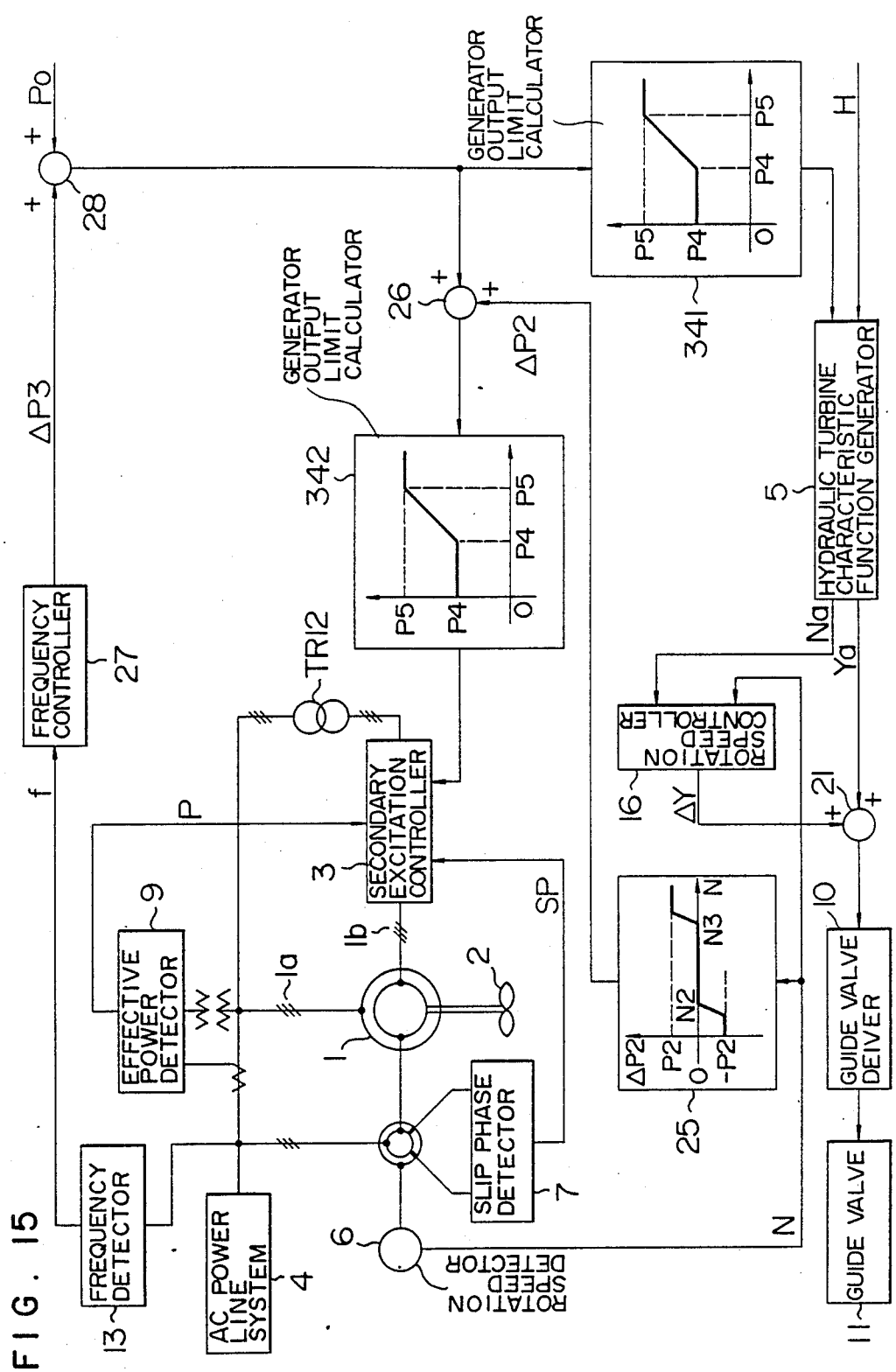
Figure 16:
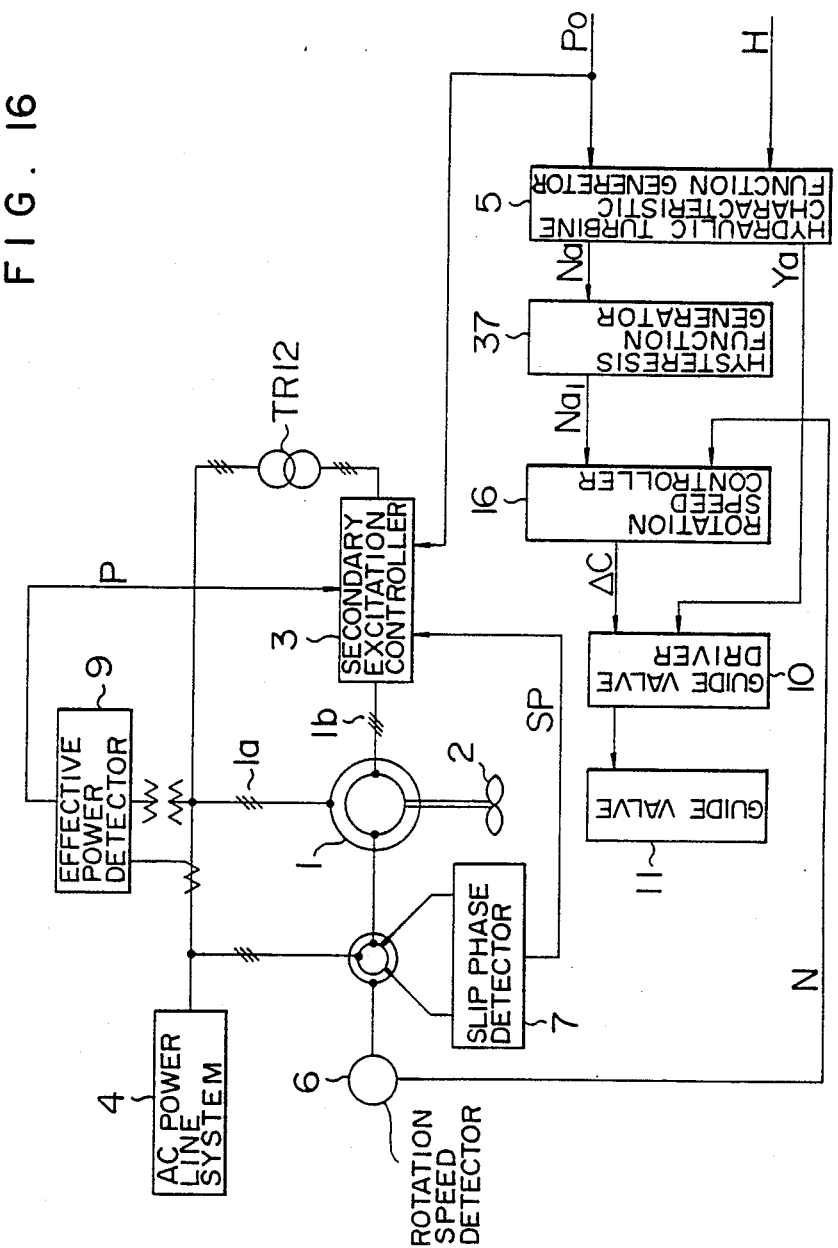

FIG. 15 shows an eighth embodiment of the invention which modifies the FIG. 41 embodiment. Generator output limit calculators 341 and 342 have each the same construction as that of the aforementioned generator output limit calculator 34. The one generator output limit calculator 341 is interposed between an adder 28 for frequency control and the input for generator output command of the hydraulic turbine characteristic generator 5, and the other 342 is interposed between an adder 26 for rotation speed regulation and the input for generator output command of the secondary excitation controller 3. According to this embodiment, even when the commands delivered to the hydraulic turbine and induction generator are modified for frequency control and rotation speed regulation, overloading can be prevented.

As has been described, since in the first to eighth embodiments of the invention the generator output is controlled directly in accordance with the externally supplied generator output command, the generator output can follow the generator output command smoothly to advantageously improve stability of the AC power line system. When the difference between the rotation speed and the optimum rotation speed is large, the generator output can be regulated transiently to thereby sustain the operation without attended by a reduction in power generation efficiency.

Referring now to FIGS. 16 to 22, a ninth embodiment of the invention will be described.

As in the prior art, the hydraulic turbine characteristic generator 5 receives the generator output command Po and water head signal H and produces the optimum rotation speed command Na and optimum guide valve opening command Ya. If the generator output command Po is a command for raising the generator output and the optimum rotation speed command Na following raising of the generator output is N1 which falls within the cycloconverter output forbidden zone, a hysteresis function generator 37 succeeding the hydraulic turbine characteristic function generator 5 produces an output, i.e., a corrected rotation speed command $Na_1$ which equals $N_{min}$ at a lower limit of the cyclo-converter output forbidden zone as shown in FIG. 19.

At a comparator 42 of the rotation speed controller 16 (See FIG. 21), the rotation speed command $Na_1$ is compared with an actual rotation speed N detected by the rotation speed detector 6 and a difference $\Delta N = Na_1 - N$ is fed to a calculator 46. The calculator 46 is comprised of a proportional element of a gain $K_7$, integration elements respectively defining $K_8/S$ and $K_9/S$, where $K_8$ and $K_9$ are gains, and an adder 43 and as far as the difference $\Delta N$ is present, it produces a correction signal $\Delta C$ which corrects the optimum guide valve opening command Ya to a value by which the difference $\Delta N$ is made zero. Specifically, the correction signal $\Delta C$ is added to the optimum guide valve opening command Ya by means of an adder 44 of the guide valve driver 10 (See FIG. 22), and a corrected guide valve opening command $(Ya + \Delta C)$ delivered out of the adder 44 is applied to an adder 45 connected in series with an integration element defining $K_{10}/S$ where $K_{10}$ is a gain. The output of the integration element is negatively fed back to the adder 45. The generator output command Po is also fed to a comparator 40 of the secondary excitation controller 3 (See FIG. 20) and compared with an actual generator output signal detected by the effective power detector 9, thus producing a difference $\Delta P = Po - P$ which in turn is fed to a power controller 39. The power controller 39 is comprised of a proportional element of a gain $K_5$, an integration element defining $K_6/S$ where $K_6$ is a gain, and an adder 41 and it produces an output signal applied to a cyclo-converter 38.

Figure 17:
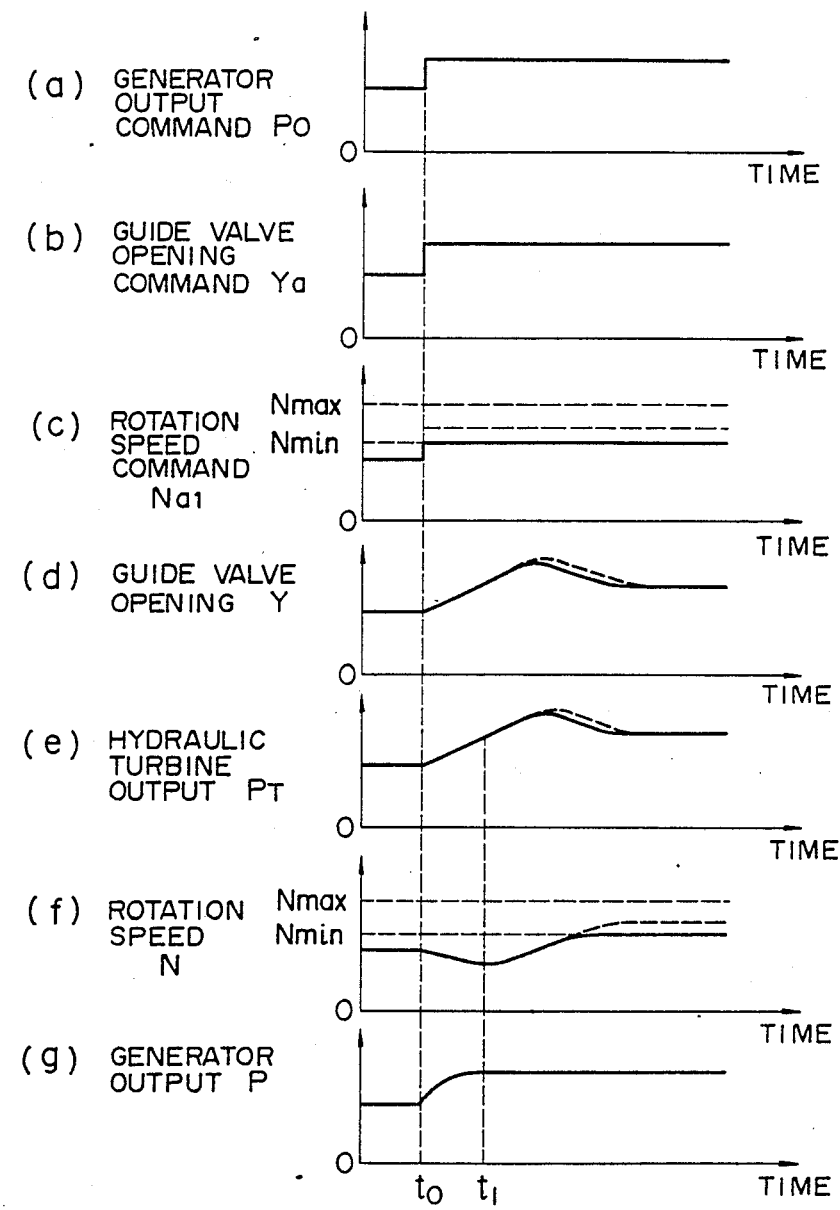
FIG. 17 illustrates at sections (a) through (g) signal waveforms appearing in the ninth embodiment.
Figure 20:
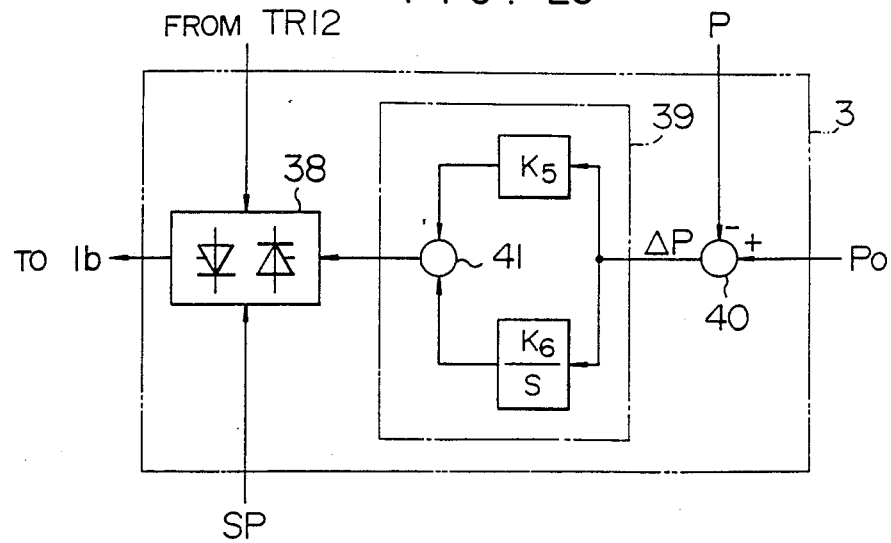
FIG. 20 is a block diagram of a secondary excitation controller used in the ninth embodiment.
Figure 21:
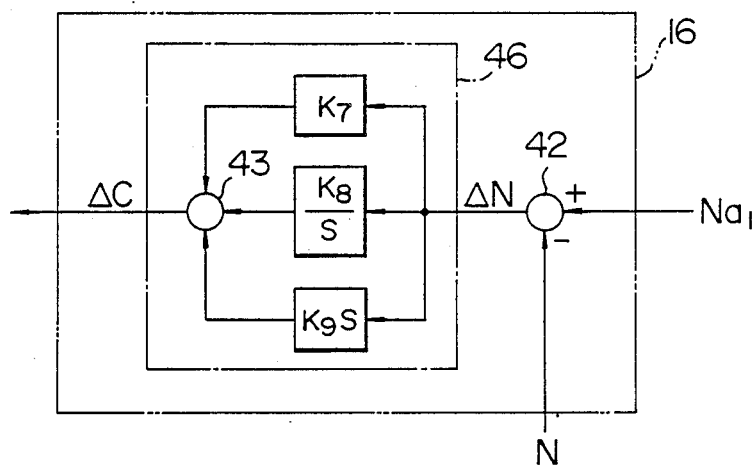
FIG. 21 is a block diagram of a rotation speed detector used in the ninth embodiment.
Figure 22:
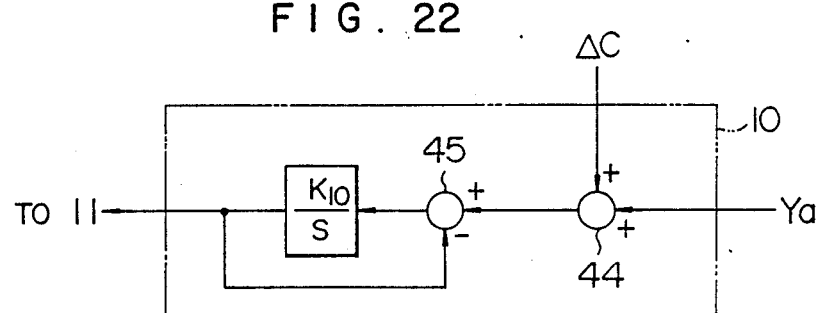
FIG. 22 is a block diagram of a guide valve driver used in the ninth embodiment.

With the control system of this embodiment constructed as above, when the generator output command Po is raised stepwise at time $t_o$ as indicated at (a) in FIG. 17 with a view of raising the generator output P, for example, stepwise to a range by way of which the rotation speed is urged to fall within the cyclo-converter output forbidden zone, the generator output P of the induction generator 1 follows a change in the generator output command Po and rises, as indicated at (g) in FIG. 17. Then, a negative feedback circuit comprised of the integration element of $K_6/S$ included in the power controller 39, cyclo-converter 38, induction generator 1, effective power detector 9 and comparator 40 included in the secondary excitation controller 3 gradually decreases the difference $\Delta P = Po - P$, and under the stationary condition, $P = Po$ stands. On the other hand, the opening Y of the guide valve 11 responds to the guide valve opening command Ya more slowly than the generator output P responds to the generator output command Po. Consequently, the hydraulic turbine output PT becomes smaller than the generator output P and after the rapid change of the generator output command Po, the rotation speed N is temporarily decelerated as indicated at (f) in FIG. 17. Thereafter, at time $t_1$ that the generator output P substantially equals the hydraulic turbine output PT as indicated at (d) in FIG. 17, the rotation speed N stops decreasing. At time $t_1$, the actual rotation speed N is smaller than the rotation speed command $Na_1$ and hence the difference $\Delta N = Na_1 - N$ is positive which causes the calculator 46 to produce a positive correction signal $\Delta C$. A guide valve opening command $(Ya + \Delta C)$ corrected by this positive correction signal $\Delta C$ exceeds the optimum guide valve opening command Ya and then, the hydraulic turbine output PT begins to exceed the generator output P. Accordingly, the rotation speed N increases to approximate the rotation speed command $Na_1$ and concurrently, the correction signal $\Delta C$ also approaches to zero. Ultimately, the guide valve opening Y coincides with the optimum guide valve opening command Ya and the rotation speed N equals the rotation speed command $Na_1$. Specifically, a negative feedback circuit comprised of the integration element of $K_8/S$ included in the calculator 46, guide valve driver 10 having the adder 44, calculator 46, guide valve 11, hydraulic turbine 2, induction generator 1, rotation speed detector 6 and comparator 42 gradually decreases the difference $\Delta N = Na_1 - N$ and under the stationary condition, $N = Na_1$ stands. Also, under the stationary condition, a difference $\Delta Y = Ya - Y = 0$ or $Ya = Y$ is established as will be explained below.

(a) The optimum guide valve opening command Ya delivered out of the hysteresis function generator 37 of course corresponds to the generator output command Po.

(b) As described previously, $P = Po$ stands under the stationary condition.

(c) Inertia of all the rotary parts such as runners of the hydraulic turbine 2 and the rotor of induction generator 1 is accelerated or decelerated by the difference between the hydraulic turbine output PT and generator output P and these rotary parts are considered to be a kind of integration element. In addition, as described previously, the negative feedback circuit is formed of the calculator 46, adder 44, guide valve driver 10, guide valve 11, hydraulic turbine 2, generator 1, rotation speed detector 6 and comparator 42. These account for the fact that $PT = P$ stands under the stationary condition.

(d) The guide valve opening Y corresponds to the hydraulic turbine output PT.

When putting the above items (a) to (d) together, the difference $\Delta Y = Ya - Y = 0$ or $Ya = Y$ stands under the stationary condition.

Conversely, where the optimum rotation speed command Na falls within the cyclo-converter output forbidden zone when the generator output command is decreased, the output of the hysteresis function generator 37, i.e., the corrected rotation speed command $Na_1$ equals $N_{max}$ at an upper limit of the cyclo-converter output forbidden zone.

As described above, according to the ninth embodiment of the invention, since the capacity of the cyclo-converter can be set under the condition that the generator rotates approximately at the synchronous speed and the cyclo-converter has the output forbidden zone and yet the generator output range equals that obtained with a cyclo-converter without the output forbidden zone, a maximized generator output range can be realized using the cyclo-converter of minimized capacity.

We claim:

1. A control system for variable speed hydraulic turbine generator apparatus comprising:
   an induction generator connected at its primary side to an AC power line system;
   a secondary excitation controller connected to the secondary side of said induction generator and being responsive to a generator output command signal supplied externally to supply to said induction generator an excitation current which causes said induction generator to generate AC power at the same frequency as that on said AC power line system;

a hydraulic turbine for rotating said induction generator;

a guide valve for regulating the amount of water supplied to said hydraulic turbine;

a rotation speed detector for detecting a rotation speed of said induction generator;

a rotation speed command calculator for receiving a hydraulic turbine running condition signal inclusive of said external generator output command signal and calculating an optimum rotation speed command;

a rotation speed controller for comparing said optimum rotation speed command with a rotation speed signal from said rotation speed detector and producing a guide valve opening control signal in accordance with a difference between said optimum rotation speed command and said rotation speed signal: and a guide valve drive responsive to said guide valve opening control signal to deliver to said guide valve a signal which controls the opening of said guide valve in accordance with said guide valve opening control signal.

2. The control system according to claim 1 wherein said rotation speed controller comprises a comparator for comparing said optimum rotation speed command with said rotation speed signal to produce said difference, a proportional element connected to receive said difference, an integration element connected in parallel with said proportional element to receive said difference, and an adder for adding together output signals from said proportional element and said integration element.

3. A control system for variable speed hydraulic turbine generator apparatus comprising:

an induction generator connected at its primary side to an AC power line system;

a secondary excitaton controller connected to the secondary side of said induction generator and being responsive to a generator output command signal supplied externally to supply to said induction generator an excitation current which causes said induction generator to generate AC power at the same frequency as that on said AC power line system;

a hydraulic turbine for rotating said induction generator;

a guide valve for regulating the amount of water supplied to said hydraulic turbine;

a rotation speed detector for detecting a rotation speed of said induction generator;

a hydraulic turbine characteristic function generator for receiving a hydraulic turbine running condition signal inclusive of said external generator output command signal, and calculating and producing an optimum rotation speed command and a guide valve opening control signal;

a rotation speed controller for comparing said optimum rotation speed command with a rotation speed signal from said rotation speed detector and producing a guide valve opening correction signal is accordance with a difference between said optimum rotation speed command and said rotation speed signal;

a first adder for adding together said guide valve opening correction signal and said guide valve opening control signal to produce an output signal; and a guide valve driver responsive to the output signal from said first adder to deliver to said guide valve a signal which controls the opening of said guide valve in accordance with said output signal.

4. The control system according to claim 3 further comprising:

a comparator for comparing said optimum rotation speed command with said rotation speed signal from said rotation speed detector to produce a difference;

a generator output modifying commander for producing a generator output modifying command signal when the absolute value of the difference delivered out of said comparator exceeds a predetermined value; and a second adder for adding together said generator output modifying command signal and said generator output command signal and delivering a resultant signal to said secondary excitation controller.

5. The control system according to claim 3 further comprising:

a generator output modifying commander for producing a generator output modifying command signal when said rotation speed signal is smaller than a first predetermined value and when it is larger than a second predetermined value; and a second adder for adding together said generator output modifying command signal and said generator output command signal and delivering a resultant signal to said secondary excitation controller.

6. The control system according to claim 3 further comprising:

a frequency detector for detecting a frequency on said AC power line system;

a frequency controller for comparing a detected frequency with a preset frequency value and producing a generator output modifying command signal in accordance with a frequency difference; and a second adder for adding together said generator output modifying command signal and said generator output command signal and delivering a resultant signal to said secondary excitation controller and said hydraulic turbine characteristic function generator.

7. The control system according to claim 3 further comprising a generator output limit calculator for producing a first preset value when said generator output command signal is in excess of said first preset value and a second preset value when it is smaller than said second preset value, said first or second preset value being delivered as a generator output command signal to said hydraulic turbine characteristic function generator and said secondary excitation controller.

8. The control system according to claim 7 wherein said first and second preset values are calculated by a generation power limit function generator supplied with said hydraulic turbine running condition signal.

9. The control system according to claim 3 further comprising:

- a frequency detector for detecting a frequency on said AC power line system;

a frequency controller for comparing a detected frequency with a preset frequency value and producing a generator output modifying command signal in accordance with a frequency difference;

a second adder for adding together said generator output modifying command signal and said generator output command signal and producing an output signal;

a first generator output limit calculator for producing a first preset value when the output signal from said second adder is in excess of said first preset value and a second preset value when it is smaller than said second preset value, said first or second preset value being delivered as a generator output command signal to said hydraulic turbine characteristic function generator;

a generator output modifying commander for producing a generator output modifying command signal when said rotation speed signal is smaller than a first predetermined value and when it is larger than a second predetermined value;

a third adder for adding together an output signal from said generator output modifying commander and said output signal from said second adder; and a second generator output limit calculator for producing the first preset value when the output signal from said third adder is in excess of said first preset value and the second preset value when it is smaller than said second preset value, said first or second preset value being delivered as a generator output command signal to said secondary excitation controller.

10. The control system according to claim 3 further comprising a hysteresis function generator for receiving said optimum rotation speed command from said hydraulic turbine characteristic function generator and delivering a corrected rotation speed command to said rotation speed controller, said hysteresis function generator producing as said corrected rotation speed command a first preset value when said rotation speed command increases from said first preset value to a second preset value which is greater than said first preset value, said second preset value when said rotation speed command equals said second preset value, said second preset value when said rotation speed command decreases from said second preset value to said first preset value, and said first preset value when said rotation speed command equals said first preset value.

* * * * *